US012294822B2

(12) United States Patent
Hashimoto

(10) Patent No.: US 12,294,822 B2
(45) Date of Patent: May 6, 2025

(54) TRANSDUCER, ANTENNA APPARATUS, WIRELESS APPARATUS, AND METHOD FOR MANUFACTURING TRANSDUCER

(71) Applicant: KABUSHIKI KAISHA TOSHIBA, Tokyo (JP)

(72) Inventor: Koh Hashimoto, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/483,015

(22) Filed: Oct. 9, 2023

(65) Prior Publication Data

US 2024/0040293 A1 Feb. 1, 2024

Related U.S. Application Data

(62) Division of application No. 17/654,078, filed on Mar. 9, 2022, now Pat. No. 11,818,522.

(30) Foreign Application Priority Data

Apr. 2, 2021 (JP) ................................ 2021-063520

(51) Int. Cl.
*H04R 1/04* (2006.01)
*H04R 1/02* (2006.01)

(52) U.S. Cl.
CPC ............... *H04R 1/04* (2013.01); *H04R 1/026* (2013.01); *H04R 2201/003* (2013.01)

(58) Field of Classification Search
None
See application file for complete search history.

(56) References Cited

U.S. PATENT DOCUMENTS

| | | | |
|---|---|---|---|
| 7,515,099 | B2 | 4/2009 | Kwon et al. |
| 2017/0324164 | A1 | 11/2017 | Cook |
| 2022/0059916 | A1 | 2/2022 | Hashimoto et al. |

FOREIGN PATENT DOCUMENTS

| | | | |
|---|---|---|---|
| JP | S60-17005 | U | 2/1985 |
| JP | H2-7703 | A | 1/1990 |

(Continued)

OTHER PUBLICATIONS

T. Tomura et al., "A 45° Linearly Polarized Hollow-Waveguide Corporate-Feed Slot Array Antenna in the 60-GHz Band," IEEE Trans. on Antennas and Propagation, vol. 60, No. 8, pp. 3640-3646 (2012).

(Continued)

*Primary Examiner* — Kenny H Truong

(74) *Attorney, Agent, or Firm* — Finnegan, Henderson, Farabow, Garrett & Dunner, LLP

(57) ABSTRACT

According to one embodiment, a transducer includes: a first conductive member; a substrate forming a first space with the first conductive member; a second conductive member opposed to the first conductive member via the substrate, and forming a second space with the substrate; first conductors electrically connecting the first conductive member with the second conductive member; a first transmission conductor in at least one of the first/the second spaces; and a second transmission conductor in at least one of the first space or the second space, and separated from the first transmission conductor, wherein the second conductive member includes a through hole through the second conductive member in a direction opposed to the first conductive member, and connecting to the second space, and an orthogonal projection of the through hole in the direction includes at least portion of each of the first/the second transmission conductor.

2 Claims, 16 Drawing Sheets

(56) References Cited

FOREIGN PATENT DOCUMENTS

| | | | |
|---|---|---|---|
| JP | 2007-24890 | A | 2/2007 |
| JP | 2022-35835 | A | 3/2022 |
| KR | 20170092731 | A | 8/2017 |

OTHER PUBLICATIONS

"Gapwaves: Contribution from Vinnova to Chalmers for Capped Bowtie," https://www.aktiespararna.se/nyheter/gapwaves-bidrag-fran-vinnova-till-chalmers-capped-bowtie-juni-2017, 1 page, and machine translation, 2 pages (2017).

S. Yamaguchi et al., "Inclined Slot Array Antennas on a Hollow Rectangular Coaxial Line," IEICE Trans. Commun., vol. E95-B, No. 9, pp. 2870-2877 (2012).

M. Sano et al., "Single-Layer Corporate-Feed Slot Array in the 60-GHz Band Using Hollow Rectangular Coaxial Lines," IEEE Trans. On Antennas and Propagation, vol. 62, No. 10, pp. 5068-5076 (2014).

TRANSDUCER, ANTENNA APPARATUS, WIRELESS APPARATUS, AND METHOD FOR MANUFACTURING TRANSDUCER

CROSS REFERENCE TO RELATED APPLICATIONS

This application is a divisional of U.S. patent application Ser. No. 17/654,078, filed on Mar. 9, 2022, which is based upon and claims the benefit of priority from Japanese Patent Application No. 2021-063520, filed on Apr. 2, 2021; the entire contents of which are incorporated herein by reference.

FIELD

Embodiments of the present invention relate to a transducer, an antenna apparatus, a wireless apparatus, and a method for manufacturing a transducer.

BACKGROUND

There is a known coaxial line where a dielectric having a conductor strip is provided in a hollow waveguide. There is also a known transducer that converts from a waveguide to such coaxial lines so as to divide a signal into the coaxial lines. There is a demand for reducing the size of such a transducer.

DETAILED DESCRIPTION

Figure 1:
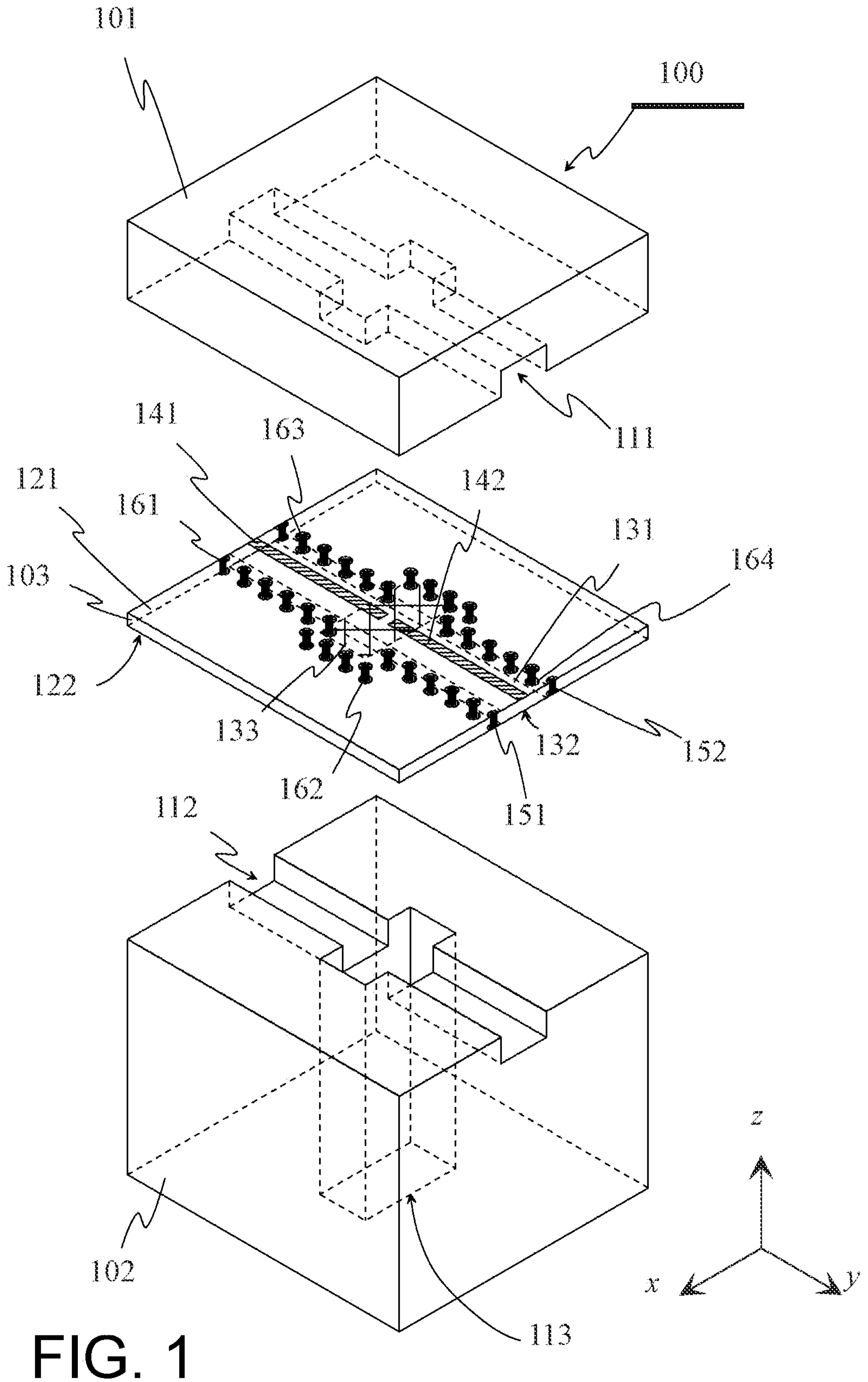
FIG. 1 is an exploded perspective view of a transducer 100 of a first embodiment.

According to one embodiment, a transducer includes a first conductive member; a substrate configured to form a first space with the first conductive member; a second conductive member opposed to the first conductive member with the substrate interposed between the second conductive member and the first conductive member, and configured to form a second space with the substrate; a plurality of first conductors through the substrate and configured to electrically connect the first conductive member with the second conductive member; a first transmission conductor being on the substrate and being in at least one of the first space or the second space; and a second transmission conductor being on the substrate, being in at least one of the first space or the second space, and separated from the first transmission conductor. The second conductive member includes a through hole through the second conductive member in a first direction in which the second conductive member is opposed to the first conductive member, and connecting to the second space. An orthogonal projection of the through hole in the first direction includes at least a portion of the first transmission conductor and at least a portion of the second transmission conductor.

Hereinafter, embodiments for carrying out the invention will be described with reference to drawings. The disclosure is merely given for the sake of example, and the invention is not limited by contents described in the following embodiments. Needless to say, modifications that those skilled in the art can easily arrive at are included in the scope of the disclosure. For the purpose of further clarifying the description, in the drawings, the size, the shape, or the like of respective components may be different from the size, shape, or the like of respective components in the actual embodiment to schematically show the respective components. In a plurality of drawings, corresponding elements are given the same reference numerals, and the detailed description of such elements may be omitted.

First Embodiment

Figure 2:
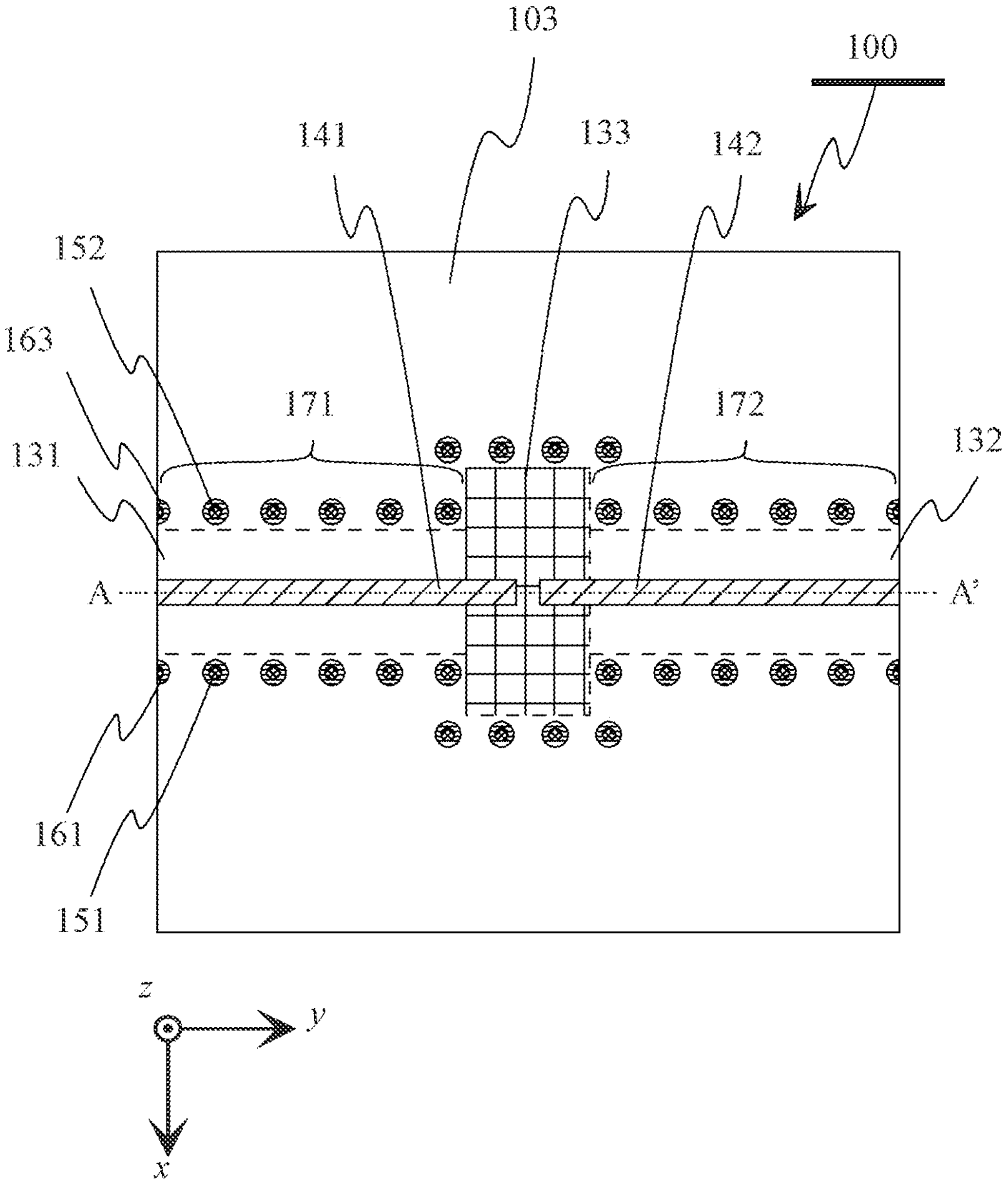
FIG. 2 is a top plan view of the transducer 100 as viewed from the +z direction.

FIG. 1 is an exploded perspective view of a transducer 100 of a first embodiment. The transducer 100 converts from a waveguide to rectangular coaxial lines, or converts from rectangular coaxial lines to a waveguide. The transducer 100 includes conductive members 101, 102 and a substrate 103. The conductive member 101 has a recess 111, and the conductive member 102 has a recess 112 and a through hole 113. The substrate 103 includes transmission conductors 141 and 142, a plurality of conductor vias 151 and 152, and a plurality of conductor patterns 161, 162, 163, and 164. FIG. 2 is a top plan view of the transducer 100 as viewed from the +z direction. For visibility purposes, the conductive member 101 is shown in a see-through manner in FIG. 2. Hereinafter, the symbol where a dot is given in a circle in the drawings indicates the direction from the back side toward the front side of the paper. The transducer 100 is an electronic apparatus that can distribute an electromagnetic wave inputted from the through hole 113 so as to propagate the electromagnetic wave through the transmission conductors 141 and 142. The transducer 100 is also an electronic apparatus that can combine electromagnetic waves inputted from the transmission conductors 141 and 142, and can propagate the combined electromagnetic wave through the through hole 113. The transducer 100 can perform at least one of the distributing or the combining.

The transducer 100 is manufactured by stacking the conductive member 102, the substrate 103, and the conductive member 101 in this order. In other words, the substrate 103 is disposed so as to be sandwiched between the conductive members 101 and 102. Any stacking method may be adopted. For example, the conductive member 102, the substrate 103, and the conductive member 101 may be fastened by screws or the like by forming holes in these components. Alternatively, the conductive member 102, the substrate 103, and the conductive member 101 may be bonded with each other by using bonding members.

Hereinafter, of surfaces of the substrate 103, the surface that faces (or is opposed to) the conductive member 101 (the surface on the +z side) is referred to as "main surface 121", and the surface that faces the conductive member 102 (the surface on the −z side) is referred to as "main surface 122". On the main surface 121, a space formed by the main surface 121 and the recess 111 (a space where the main surface 121 faces the recess 111) is referred to as "space 131". On the main surface 122, a space formed by the main surface 122 and the recess 112 (a space where the main surface 122 faces the recess 112) is referred to as "space 132". The conductive member 101 may be referred to as "first conductive member". The conductive member 102 may be referred to as "second conductive member". The recess 111 may be referred to as "first recess". The recess 112 may be referred to as "second recess". The space 131 may be referred to as "first space". The space 132 may be referred to as "second space". The orthogonal projection of the space 131 with respect to the substrate 103 at least partially overlaps with the orthogonal projection of the space 132 with respect to the substrate 103. In FIG. 1, the orthogonal projection of the space 131 with respect to the substrate 103 overlaps with the orthogonal projection of the space 132 with respect to the substrate 103.

The conductive members 101 and 102 are made of a conductor, such as copper, aluminum, nickel, silver, or gold. The surfaces of the conductive members 101 and 102 may be plated with conductors of different kinds. For example, the surface of a resin may be plated with a conductor, or the surface of a conductor A may be plated with a conductor B having greater conductivity than the conductor A. From a viewpoint of a transmission loss, it is desirable that the surface have higher conductivity. In the transducer 100, the conductive member 101, the substrate 103, and the conductive member 102 are stacked and hence, the conductive member 102 faces the conductive member 101 with the substrate 103 interposed therebetween.

Each of the conductive members 101 and 102 may have a portion where a hole or a slit is present. In such a case, the space 131 or the space 132 is defined by assuming that the conductive member 101 or 102 is also present in the hole or the slit. The space 131 or the space 132 may be defined by assuming that the conductive member 101 or 102 is present by extending a straight line from the conductive member 101 or 102 disposed around the portion where the hole or the slit is present. Alternatively, the space 131 or the space 132 may be defined by assuming that the conductive member 101 or 102 is present by extending a curved line from the conductive member 101 or 102 disposed around the portion where the hole or the slit is present.

The substrate 103 is an insulator. For example, a dielectric is used. A resin substrate made of polytetrafluoroethylene (PTFE), modified polyphenylene ether (PPE), or the like, a film substrate made of resin foam, liquid crystal polymer, COP (cycloolefin copolymer), or the like, ceramics, such as low temperature co-fired ceramics (LTCC) or high temperature co-fired ceramics (HTCC), paper phenol, magnesium oxide (MgO), glass or the like is used. Alternatively, a composite material may be used. An example of the composite material is a composite material obtained by mixing ceramic filler or glass cloth into PTFE.

The recesses 111 and 112 form the spaces 131 and 132 with the substrate 103. In FIG. 1, the recess 111 is indicated in the conductive member 101 by a broken line, and the recess 112 is indicated in the conductive member 102 by a solid line and partially by a broken line. In FIG. 1, the recess 111 is shown as a groove including a groove parallel to the xy plane, having a width in the x direction, having a uniform depth (z direction), and extending in they direction, and a groove having a uniform depth and having a shape of a cross section of the through hole 113, which will be described later, the cross section being taken along the xy plane. The recess 112 is shown as a groove parallel to the xy plane, having a width in the x direction, having a uniform depth (z direction), and extending in the y direction.

The mode of the recesses 111 and 112 may be any mode. For example, by taking into account the manufacture of the recesses 111 and 112, the recesses 111 and 112 may have drafts, or corners of the bottom surfaces of the recesses 111 and 112 may be rounded. The recesses 111 and 112 may have the same depth (a dimension in the z direction), or may have different depths. Each of the recesses 111 and 112 may have a constant depth (a dimension in the z direction), or at least a portion of each of the recesses 111 and 112 may have a different depth. The recess 111 has a cross shape having a width as viewed from the +z direction. The recess 112 has a rectangular shape. However, the recess 112 may have another polygonal shape, or at least a portion of the recess 112 may be rounded or curved.

The through hole 113 penetrates through the conductive member 102 in the +z direction, and connects to the space 132. In FIG. 1, the through hole 113 is indicated in the conductive member 102 by a broken line and partially by a solid line. The through hole 113 serves as a hollow portion of a waveguide. In FIG. 1, the through hole 113 has a hollow portion having a rectangular parallelepiped shape, for example. However, by taking into account the manufacture, the through hole 113 may have draft, or corners of the side surfaces of the through hole 113 may be rounded. The through hole 113 has a rectangular shape as viewed from the +z direction. However, the through hole 113 may have another polygonal shape, or at least a portion of the through hole 113 may be rounded or curved.

The +z direction may also be referred to as "direction in which the conductive member 102 faces the conductive member 101 (first direction)". On a plane parallel to at least one of the main surface 121 or the main surface 122, the longitudinal direction of the through hole 113 is substantially orthogonal to the longitudinal direction of at least one of the transmission conductor 141 or the transmission conductor 142 which will be described later. The term "substantially orthogonal" is not limited only to "exactly orthogonal", and allows manufacturing errors, for example. On the plane parallel to at least one of the main surface 121 or the main surface 122, the length of the through hole 113 in a lateral direction is ½ or less of the wavelength of an electromagnetic wave used in the transducer 100.

The transmission conductors 141 and 142 are made of a conductor, such as copper, aluminum, nickel, silver, or gold. The transmission conductor is also referred to as "conductor strip". The transmission conductors 141 and 142 are provided on the substrate 103, and are provided in at least one of the space 131 or the space 132. For example, in FIG. 1 and FIG. 2, the transmission conductors 141 and 142 are provided on the main surface 121, and are provided in the space 131. In FIG. 1 and FIG. 2, the transmission conductors 141 and 142 have the longitudinal direction parallel to the y direction, and are positioned substantially at the center of the space 131 in the x direction. The transmission conductors 141 and 142 are separated from each other, and are not electrically connected with each other. The end of the transmission conductor 141 faces the end of the transmission conductor 142. In FIG. 1 and FIG. 2, the end of the transmission conductor 141 in the +y direction faces the end of the transmission conductor 142 in the −y direction. A distance from the transmission conductor 141 to the transmission conductor 142, in other words, a distance from the end of the transmission conductor 141 to the end of the transmission conductor 142, which faces the end of the transmission conductor 141, is ½ or less of the wavelength of an electromagnetic wave used in the transducer 100. The orthogonal projection of the through hole 113 in the z direction includes at least a portion of the transmission conductor 141 and at least a portion of the transmission conductor 142. An orthogonal projection 133 on the main surface 121 has a rectangular shape and is cross-hatched in FIG. 2.

Any forming method may be adopted as a method for forming the transmission conductors 141 and 142. For example, the transmission conductors 141 and 142 are formed by etching a substrate where a conductor is applied to the surface of the substrate (subtractive method) or by an additive method where a conductor pattern is formed on a substrate having no conductor. However, another method may be adopted. The surfaces of the transmission conductors 141 and 142 may be plated with conductors of different kinds, or solder resist, flux, solder labeler, or the like may be applied to the surfaces of the transmission conductors 141 and 142 by coating.

A space formed by the conductive member 101 and the substrate 103 is taken as the space 131, and a space formed by the conductive member 102 and the substrate 103 is taken as the space 132. Therefore, it is defined that the transmission conductors 141 and 142 are present in at least one of the space 131 or the space 132.

The conductors 151 and 152 penetrate through the substrate 103. In FIG. 1 and FIG. 2, the conductors 151 and 152 penetrate through the main surfaces 121 and 122 of the substrate 103 in the z direction. The conductors 151 and 152 are electrically connected with the conductive members 101 and 102. At least some of the conductors 151 and 152 surround (are disposed along) the orthogonal projections of the spaces 131 and 132 with respect to the substrate 103. In other words, at least some of the conductors 151 and 152 surround (are disposed along) the orthogonal projections of the recesses 111 and 112 with respect to the substrate 103. In FIG. 1 and FIG. 2, the conductors 151 are provided on the +x side of the spaces 131 and 132, and the conductors 152 are provided on the −x side of the spaces 131 and 132. The interval between the plurality of conductors forming the conductors 151 and 152 is small relative to the wavelength of an electromagnetic wave used in the transducer 100.

Any forming method may be adopted as a method for forming the conductors 151 and 152. For example, the conductors 151 and 152 may be formed in such a manner that holes are formed in the substrate 103 by using a drill or the like and the inner wall surfaces of the holes are plated with a conductor, or a conductor or a conductive resin is filled in the holes. Further, at least some of the conductors 151 and 152 may be formed by using a different forming method. Hereinafter, the conductor may also be referred to as “conductor via”. The conductors 151 and 152 may also be referred to as “plurality of first conductors”.

The conductor patterns 161 electrically connect the conductive member 101 with the conductors 151. The conductor patterns 162 electrically connect the conductive member 102 with the conductors 151. The conductor patterns 163 electrically connect the conductive member 101 with the conductors 152. The conductor patterns 164 electrically connect the conductive member 102 with the conductors 152. That is, the conductive member 101 and the conductive member 102 are electrically connected with each other via the conductor patterns 161, the conductors 151, and the conductor patterns 162, and are electrically connected with each other via the conductor patterns 163, the conductors 152, and the conductor patterns 164. In FIG. 1 and FIG. 2, the conductor patterns 161 and 163 are provided on the main surface 121, and the conductor patterns 162 and 164 are provided on the main surface 122. In FIG. 1 and FIG. 2, each of the conductor patterns 161 to 164 is conducted with one conductor 151 or one conductor 152. However, at least some conductor patterns may be conducted with two or more conductors 151 or two or more conductors 152.

The conductor patterns 161 to 164 are made of a conductor, such as copper, aluminum, nickel, silver, or gold. The same kind of conductor may be used for the respective conductor patterns 161 to 164, or a different kind of conductor may be used for at least some of the conductor patterns 161 to 164. Any forming method may be adopted as a method for forming the conductor patterns 161 to 164. For example, the conductor patterns 161 to 164 are formed by etching a substrate where a conductor is applied to the surface of the substrate (subtractive method) or by an additive method where a conductor pattern is formed on a substrate having no conductor. However, another method may be adopted. The surfaces of the conductor patterns 161 to 164 may be plated with conductors of different kinds, or solder resist, flux, solder labeler, or the like may be applied to the surfaces of the conductor patterns 161 to 164 by coating. The conductor patterns 161 to 164 may have any shape. For example, the conductor patterns 161 to 164 have a circular shape in FIG. 1 and FIG. 2. However, the conductor patterns 161 to 164 may have a polygonal shape, such as a triangular shape or a quadrangular shape, an elliptical shape, or a shape having at least a rounded portion or a curved portion. The conductor patterns 161 and 163 may also be referred to as “first conductor pattern”, and the conductor patterns 162 and 164 may also be referred to as “second conductor pattern”.

The transmission conductor 141 and the conductive members 101 and 102 form the coaxial line 171, and the transmission conductor 142 and the conductive members 101 and 102 form the coaxial line 172. In the coaxial line 171, the transmission conductor 141 corresponds to an inner conductor, and the conductive members 101 and 102 correspond to outer conductors. In the coaxial line 172, the transmission conductor 142 corresponds to an inner conductor, and the conductive members 101 and 102 correspond to outer conductors.

Figure 3:
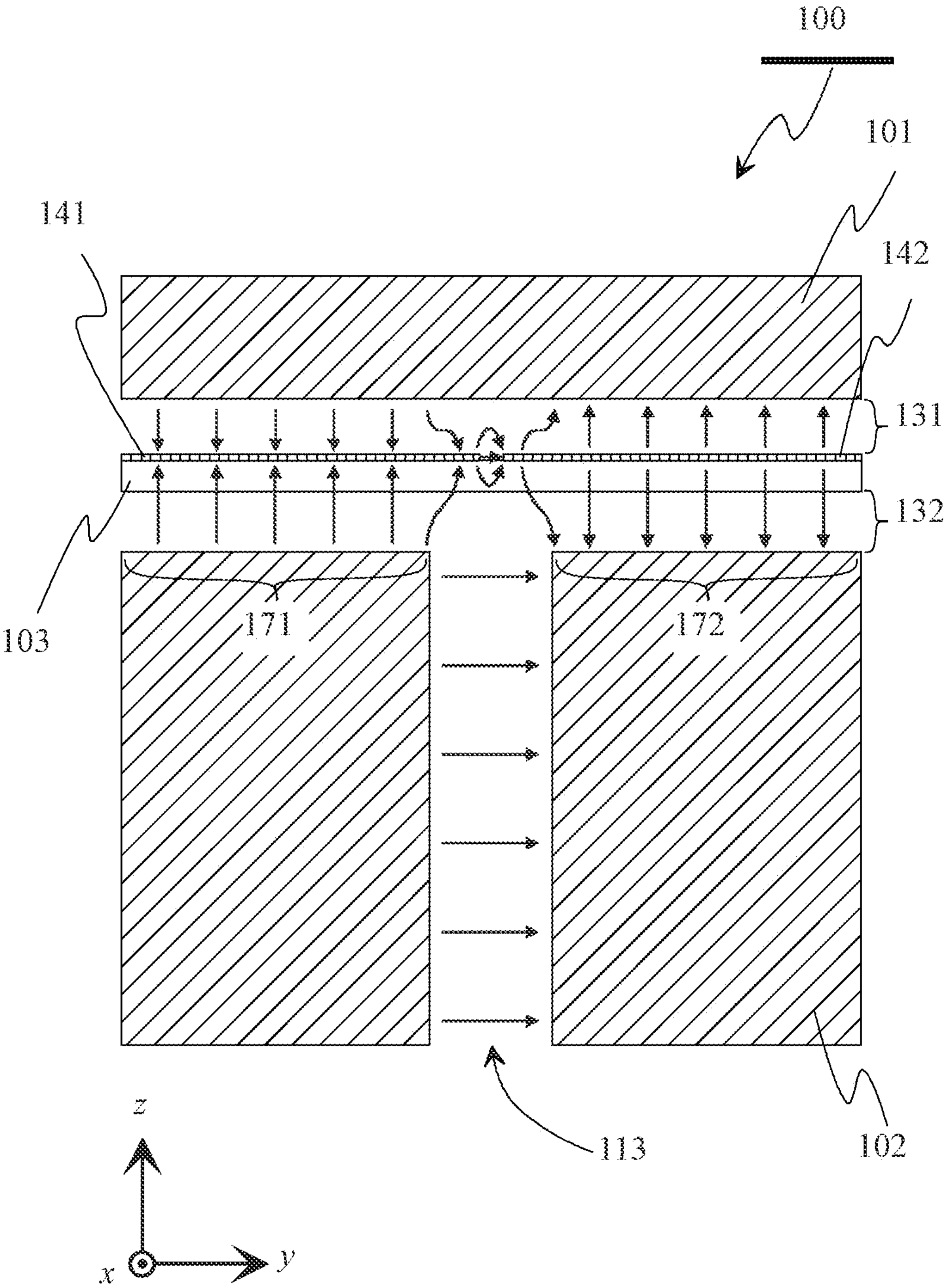
FIG. 3 is a yz plan view showing an electric field of an electromagnetic wave in the transducer 100.

FIG. 3 is a yz plan view showing an electric field of an electromagnetic wave in the through hole 113 and the coaxial lines 171 and 172 of the transducer 100. This plan view is a cross sectional view taken along A-A' in FIG. 2. FIG. 3 shows the case where an electromagnetic wave is inputted from the −z direction of the through hole, has an electric field in the +y direction, and is propagated through the coaxial lines 171 and 172.

In the coaxial line 171, an electromagnetic wave has an electric field in the −z direction from the conductive member 101 toward the transmission conductor 141 in the space 131, has an electric field in the +z direction from the conductive member 102 toward the transmission conductor 141 in the space 132, and is propagated in the −y direction. At the end portion of the transmission conductor 141 in the +y direction, an electromagnetic wave has an electric field in a direction toward such an end portion in the spaces 131 and 132.

In the coaxial line 172, an electromagnetic wave has an electric field in the +z direction from the transmission conductor 142 toward the conductive member 101 in the space 131, has an electric field in the −z direction from the transmission conductor 142 toward the conductive member 102 in the space 132, and is propagated in the +y direction. In the space 131, an electromagnetic wave has an electric field in the +z direction, the electric field also bending in the +y direction from the end portion of the transmission conductor 142 in the −y direction. In the space 132, an electromagnetic wave has an electric field in the −z direction, the electric field also bending in the +y direction from the end portion of the transmission conductor 142 in the −y direction. The end portion of the transmission conductor 141 in the +y direction faces the end portion of the transmission conductor 142 in the −y direction. At such end portions, an electromagnetic wave has an electric field in the direction from the end portion of the transmission conductor 141 in the +y direction toward the end portion of the transmission conductor 142 in the −y direction.

In the case where the transmission conductors 141 and 142 are disposed with a distance therebetween and the longitudinal direction of the through hole 113 is substantially orthogonal to the longitudinal direction of at least one of the transmission conductor 141 or the transmission conductor 142, the direction of the electric field in the coaxial line 171 is opposite to the direction of the electric field in the coaxial line 172. The direction of the electric field in the coaxial line 171 being opposite to the direction of the electric field in the coaxial line 172 indicates that the phase of the electromagnetic wave being propagated through the coaxial line 171 is a substantially opposite phase (also referred to as "reverse phase") of the phase of the electromagnetic wave being propagated through the coaxial line 172. The term "substantially opposite phase" is not limited to "exactly opposite phase", and allows tolerance of approximately ±10, for example. Hereinafter, an opposite phase refers to the above-mentioned substantially opposite phase.

An electric field is also dispersed in the spaces 131 and 132 and hence, the coaxial lines 171 and 172 serve as transmission lines with a lower loss compared with a printed circuit board transmission line. In the case where a clearance is formed between the conductive members 101 and 102 in addition to the spaces 131 and 132, a part of the electromagnetic wave being propagated through the coaxial line 171 or the coaxial line 172 leaks from such a clearance, so that a transmission loss increases. In the transducer 100, the substrate 103 is present between the conductive members 101 and 102. The substrate 103 is an insulator. Therefore, even when the substrate 103 is brought into close contact with the conductive members 101 and 102, an electrical clearance having a thickness corresponding to the thickness of the substrate 103 is present. Therefore, there is a possibility that a part of an electromagnetic wave leaks through the substrate 103, so that a transmission loss increases.

However, in the substrate 103, the peripheries of the spaces 131 and 132 are surrounded by the conductors 151 and 152. Further, the conductors 151 and 152 are electrically connected with the conductive members 101 and 102 via the conductor patterns 161 to 164. When an electromagnetic wave is propagated, an electric current flows into the conductive member 102 from the conductive member 101 through the conductor patterns 161, the conductors 151, and the conductor patterns 162. The interval between the conductors 151 is small relative to the wavelength of an electromagnetic wave used in the transducer 100 and hence, leakage of the electromagnetic wave in the +x direction is suppressed. In the same manner, when an electromagnetic wave is propagated, an electric current flows into the conductive member 102 from the conductive member 101 through the conductor patterns 163, the conductors 152, and the conductor patterns 164. The interval between the conductors 152 is small relative to the wavelength of an electromagnetic wave used in the transducer 100 and hence, leakage of the electromagnetic wave in the −x direction is suppressed. The conductors 151 and 152 and the conductor patterns 161 to 164 suppress an increase in transmission loss.

The transducer 100 has been described heretofore. This embodiment is given for the sake of example, and various modifications are conceivable. Modifications which are applicable to this embodiment will be described below. Hereinafter, constituent elements substantially equal to the corresponding constituent elements in this embodiment are given the same reference symbols, and the description of such constituent elements will be omitted.

(Modification 1)

The transducer 100 is manufactured by stacking the conductive members 101, 102 and the substrate 103. The conductive members 101, 102, and the substrate 103 to be stacked are separately manufactured. When FIG. 1 is taken as an example, the transducer 100 is manufactured by stacking the conductive member 101, the substrate 103, and the conductive member 102 in this order from the +z direction, the conductive member 101 having the recess 111, the substrate 103 including the transmission conductors 141 and 142, the conductors 151 and 152, and the conductor patterns 161 to 164, the conductive member 102 having the recess 112 and the through hole 113. In manufacturing the substrate 103, the transmission conductors 141 and 142 may be provided on the main surface 122, or may be provided on the main surfaces 121 and 122.

(Modification 2)

Figure 4:
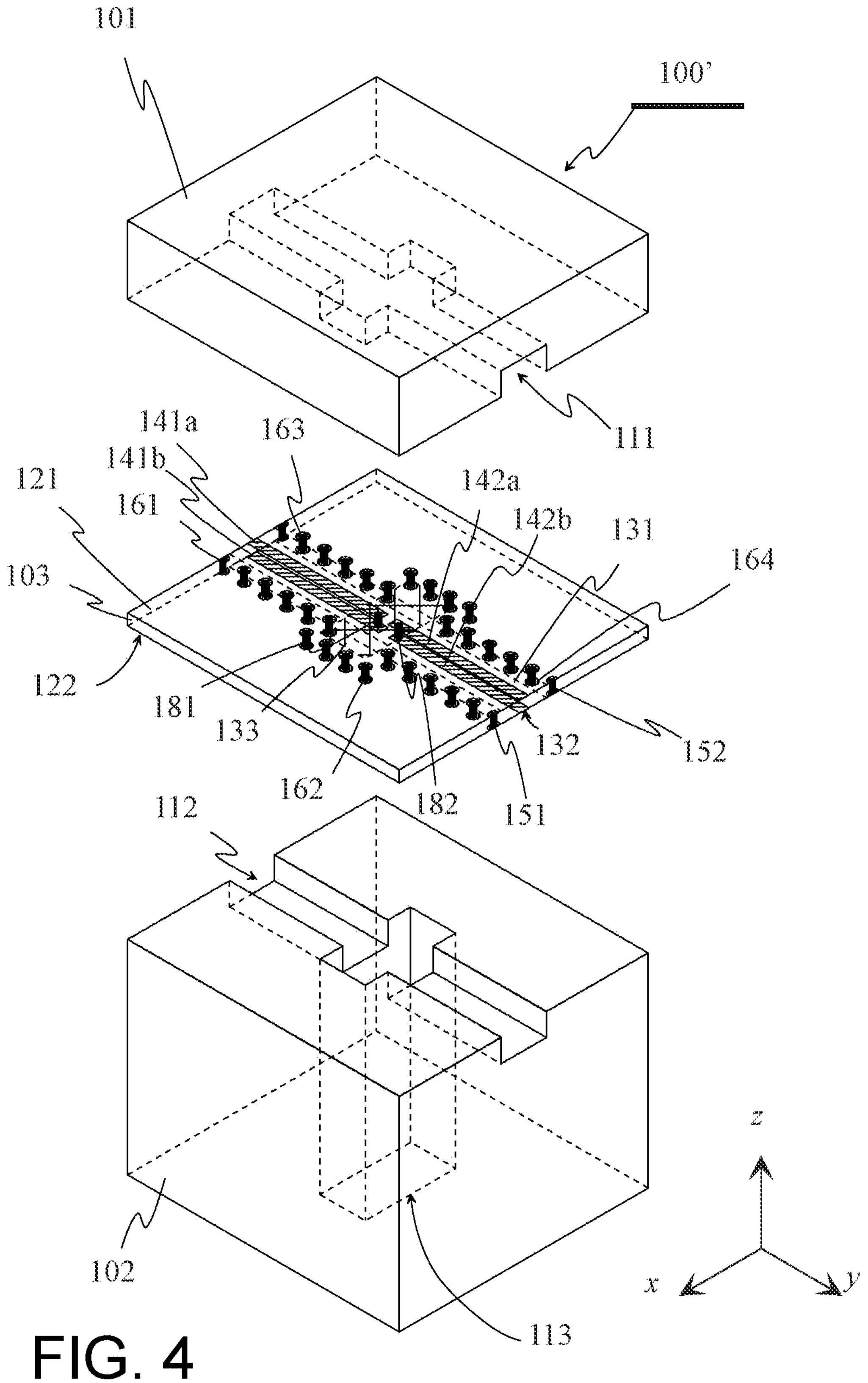
FIG. 4 is an exploded perspective view of a transducer 100' which is applicable to the first embodiment.

FIG. 4 is an exploded perspective view of a transducer 100' of a modification 2. In the transducer 100', the transmission conductors 141 and 142 are provided on the main surfaces 121 and 122, and conductors 181 and 182 are also provided. The transmission conductor 141 on the main surface 121 is referred to as "transmission conductor 141*a*". The transmission conductor 141 on the main surface 122 is referred to as "transmission conductor 141*b*". The transmission conductor 142 on the main surface 121 is referred to as "transmission conductor 142*a*". The transmission conductor 142 on the main surface 122 is referred to as "transmission conductor 142*b*". The transmission conductors 141*a* and 142*a* are provided in the space 131, and the transmission conductors 141*b* and 142*b* are provided in the space 132. The transmission conductors 141*a*, 141*b*, 142*a*, and 142*b* may be substantially the same kind of conductors and may be provided by substantially the same forming method. Alternatively, at least some of the transmission conductors may differ from other transmission conductors in at least one of the kind of conductor or the forming method.

The conductors 181 and 182 penetrate through the substrate 103. In FIG. 4, the conductors 181 and 182 penetrate through the main surfaces 121 and 122 of the substrate 103 in the z direction. The conductor 181 electrically connects the transmission conductor 141*a* with the transmission conductor 141*b*. The conductor 182 electrically connects the transmission conductor 142*a* with the transmission conductor 142*b*. For a method for forming the conductors 181 and 182, it is possible to use a method substantially equal to the method described with respect to the method for forming the conductors 151 and 152. In FIG. 4, one conductor 181 and one conductor 182 are used. However, at least one of the conductor 181 or the conductor 182 may be in plural. For example, a plurality of conductors 181 may be formed along the transmission lines 141*a*, 141*b* at predetermined intervals, and a plurality of conductors 182 may be formed along the transmission lines 142*a*, 142*b* at predetermined intervals. Further, at least some of the conductors 181 and 182 may be formed by using a different forming method.

The transmission conductors 141, 142 are provided on both surfaces of the substrate 103 and hence, it is possible to improve transmission efficiency of an electromagnetic wave.

As has been described heretofore, the transducer of this embodiment distributes an electromagnetic wave inputted from the through hole 113 so as to propagate the electromagnetic wave through the transmission conductors 141 and 142 (the coaxial lines 171 and 172). In the case where the transducer disclosed in Japanese Utility Model Laid-Open No. 60-17005 converts from the waveguide to the coaxial line, a connection with a waveguide is separated from a connection with a coaxial line. In the transducer of this embodiment, the connection of the waveguide is not separated from the connection of the coaxial line and hence, it is possible to achieve a small-sized transducer. By reducing the size of the transducer, it is possible to reduce a weight, to improve the degree of freedom in design of the waveguide and the coaxial line, and to reduce costs, for example. The transducer disclosed in Japanese Utility Model Laid-Open No. 60-17005 can only distribute an electromagnetic wave in the same phase when distributing the electromagnetic wave to the coaxial lines. The transducer of this embodiment can distribute an electromagnetic wave in the opposite phase.

The transducer of this embodiment combines electromagnetic waves inputted into the transmission conductors 141 and 142 (the coaxial lines 171 and 172), and propagates the combined electromagnetic wave through the through hole 113. In the same manner as the case where an electromagnetic wave is distributed, the transducer of this embodiment can reduce a size, reduce a weight, improve the degree of freedom in design of the waveguide and the coaxial line, and reduce costs compared with the transducer disclosed in Japanese Utility Model Laid-Open No. 60-17005. In the transducer of this embodiment, the phase of an electromagnetic wave inputted into the transmission conductor 141 (the coaxial line 171) and the phase of an electromagnetic wave inputted into the transmission conductor 142 (the coaxial line 172) are opposite phase. The transducer of this embodiment can perform combining corresponding to the opposite phase.

Second Embodiment

Figure 5:
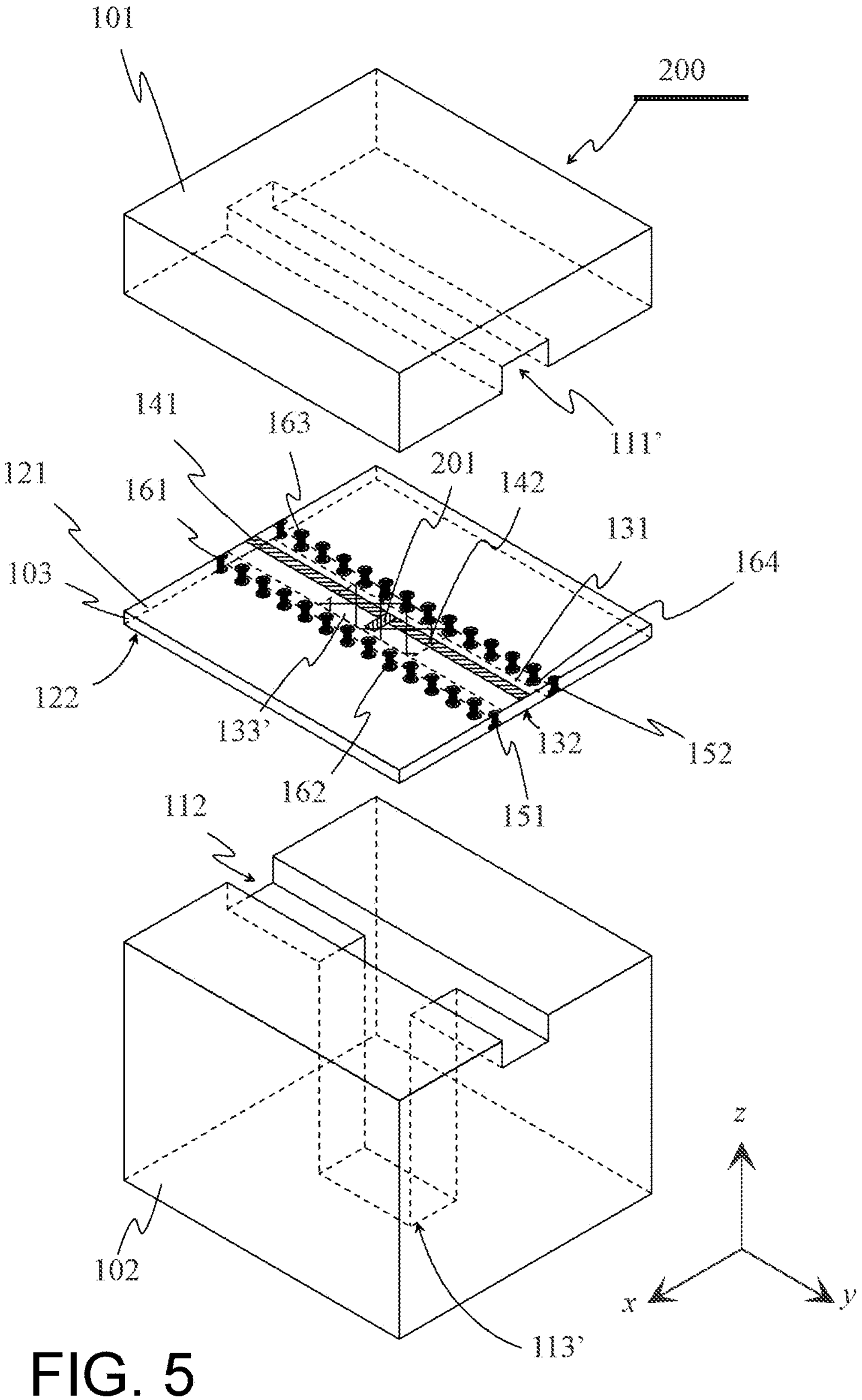
FIG. 5 is an exploded perspective view of a transducer 200 of a second embodiment.
Figure 6:
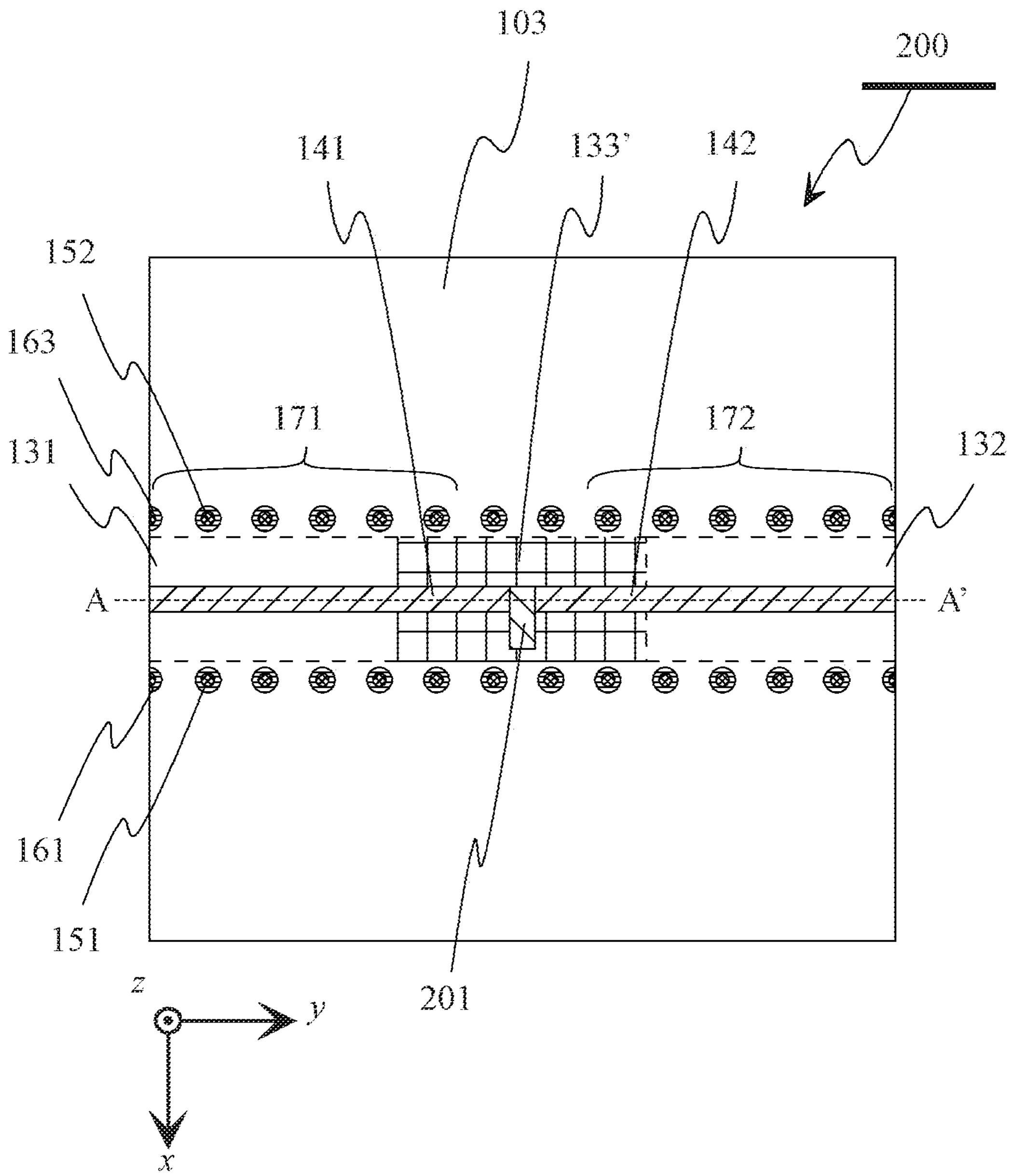
FIG. 6 is a top plan view of the transducer 200 as viewed from the +z direction.

FIG. 5 is an exploded perspective view of a transducer 200 of a second embodiment. The transducer 200 has a recess 111' having a shape different from the shape of the recess 111 of the transducer 100 of the first embodiment, and a through hole 113' having a shape different from the shape of the through hole 113. The transducer 200 also includes a coupling conductor 201. Constituent elements of the transducer 200 other than the recess 111', the through hole 113', and the coupling conductor are substantially equal to the corresponding constituent elements of the transducer 100 and hence, the corresponding constituent elements are given the same numerals, and the description of such constituent elements will be omitted. FIG. 6 is a top plan view of the transducer 200 as viewed from the +z direction. For visibility purposes, the conductive member 101 is shown in a see-through manner in FIG. 6. In the same manner as the transducer 100, the transducer 200 is an electronic apparatus that can distribute an electromagnetic wave inputted from the through hole 113' so as to propagate the electromagnetic wave through the transmission conductors 141 and 142. The transducer 200 is also an electronic apparatus that can combine electromagnetic waves inputted from the transmission conductors 141 and 142 and can propagate the combined electromagnetic wave through the through hole 113'. The transducer 200 can perform at least one of the distributing or the combining.

The shape of the through hole 113' is changed and hence, the shape of the recess 111' is partially changed. In FIG. 5, the recess 111' is described as a groove parallel to the xy plane, having a width in the x direction, having a uniform depth (z direction), and extending in the y direction.

The through hole 113' differs from the corresponding through hole in the first embodiment in the longitudinal direction. On a plane parallel to at least one of the main surface 121 or the main surface 122, the longitudinal direction of the through hole 113' is substantially parallel to the longitudinal direction of at least one of the transmission conductor 141 or the transmission conductor 142 which will be described later. The term “substantially parallel” is not limited only to “exactly parallel”, and allows manufacturing errors, for example.

The coupling conductor 201 is a conductor having a portion which electrically connects the transmission conductor 141 with the transmission conductor 142, and extends in a direction intersecting (or crossing) with the longitudinal direction of the transmission conductors 141 and 142. The coupling conductor 201 is provided on the substrate 103, and is provided in at least one of the space 131 or the space 132. For example, in FIG. 5 and FIG. 6, the coupling conductor 201 is a T-shaped conductor provided on the main surface 121 and provided in the space 131. A conductor and a forming method substantially equal to the conductor and the forming method described with respect to the transmission conductors 141 and 142 may be used for the coupling conductor 201.

Figure 7:
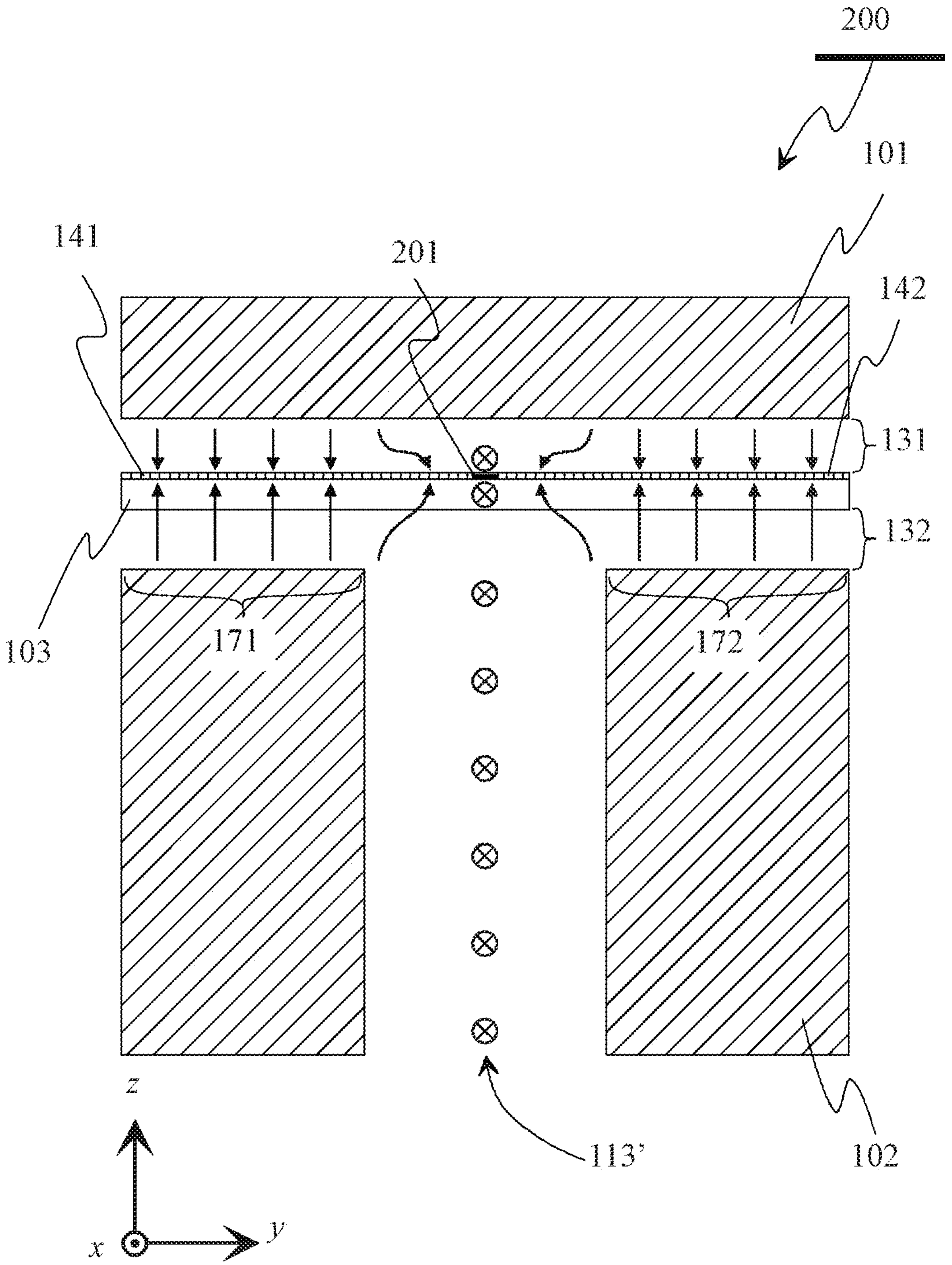
FIG. 7 is a yz plan view showing an electric field of an electromagnetic wave in the transducer 200.

FIG. 7 is a yz plan view showing an electric field of an electromagnetic wave in the through hole 113' and the coaxial lines 171 and 172 of the transducer 200. This plan view is a cross sectional view taken along A-A' in FIG. 6. FIG. 7 shows the case where an electromagnetic wave is inputted from the −z direction of the through hole, has an electric field in the −x direction, and is propagated through the coaxial lines 171 and 172. Hereinafter, the symbol where x is given in a circle in the drawings indicates the direction from the front side toward the back side of the paper.

In the coaxial line 171, an electromagnetic wave has an electric field in the −z direction from the conductive member 101 toward the transmission conductor 141 in the space 131, has an electric field in the +z direction from the conductive member 102 toward the transmission conductor 141 in the space 132, and is propagated in the −y direction. At a portion where the through hole 113' is present as viewed from the z direction, an electromagnetic wave has an electric field in a direction toward the end portion of the transmission conductor 141 in the +y direction in the spaces 131 and 132.

In the coaxial line 172, an electromagnetic wave has an electric field in the −z direction from the conductive member 101 toward the transmission conductor 142 in the space 131, has an electric field in the +z direction from the conductive member 102 toward the transmission conductor 142 in the space 132, and is propagated in the +y direction. At a portion where the through hole 113' is present as viewed from the z direction, an electromagnetic wave has an electric field in the −z direction from the conductive member 101 toward the end portion of the transmission conductor 142 in the −y direction in the space 131, the electric field also bending in the −y direction, and an electromagnetic wave has an electric field in the +z direction from the conductive member 102 toward the end portion of the transmission conductor 142 in the −y direction in the space 132, the electric field also bending in the −y direction. Above and below the coupling conductor 201 in the ±z direction, in both the spaces 131 and 132, an electromagnetic wave has an electric field in the direction from the front side toward the back side of the paper.

In the case where the transmission conductors 141 and 142 are electrically connected by the coupling conductor 201 and the longitudinal direction of the through hole 113' is substantially parallel to the longitudinal direction of at least one of the transmission conductor 141 or the transmission conductor 142, the direction of the electric field in the coaxial line 171 is equal to the direction of the electric field in the coaxial line 172. In other words, the direction of the electric field in the coaxial line 171 and the direction of the electric field in the coaxial line 172 are axially symmetric about the z axis at the center of the through hole 113'. The direction of the electric field in the coaxial line 171 being the same to the direction of the electric field in the coaxial line 172 indicates that the phase of the electromagnetic wave being propagated through the coaxial line 171 and the phase of the electromagnetic wave being propagated through the coaxial line 172 are substantially the same phase (also referred to as "in phase"). The term "substantially the same phase" is not limited to "exactly the same phase", and allows tolerance of approximately ±10, for example. Hereinafter, the term "same phase" refers to the above-mentioned "substantially the same phase".

The conductors 151 and 152 and the conductor patterns 161 to 164 suppress an increase in transmission loss in the same manner as the first embodiment.

The transducer 200 has been described heretofore. This embodiment is given for the sake of example, and various modifications are conceivable. For example, the modification described in the first embodiment is applicable without causing confliction. Modifications which are applicable to this embodiment will be described below.

(Modification 3)

Figure 8:
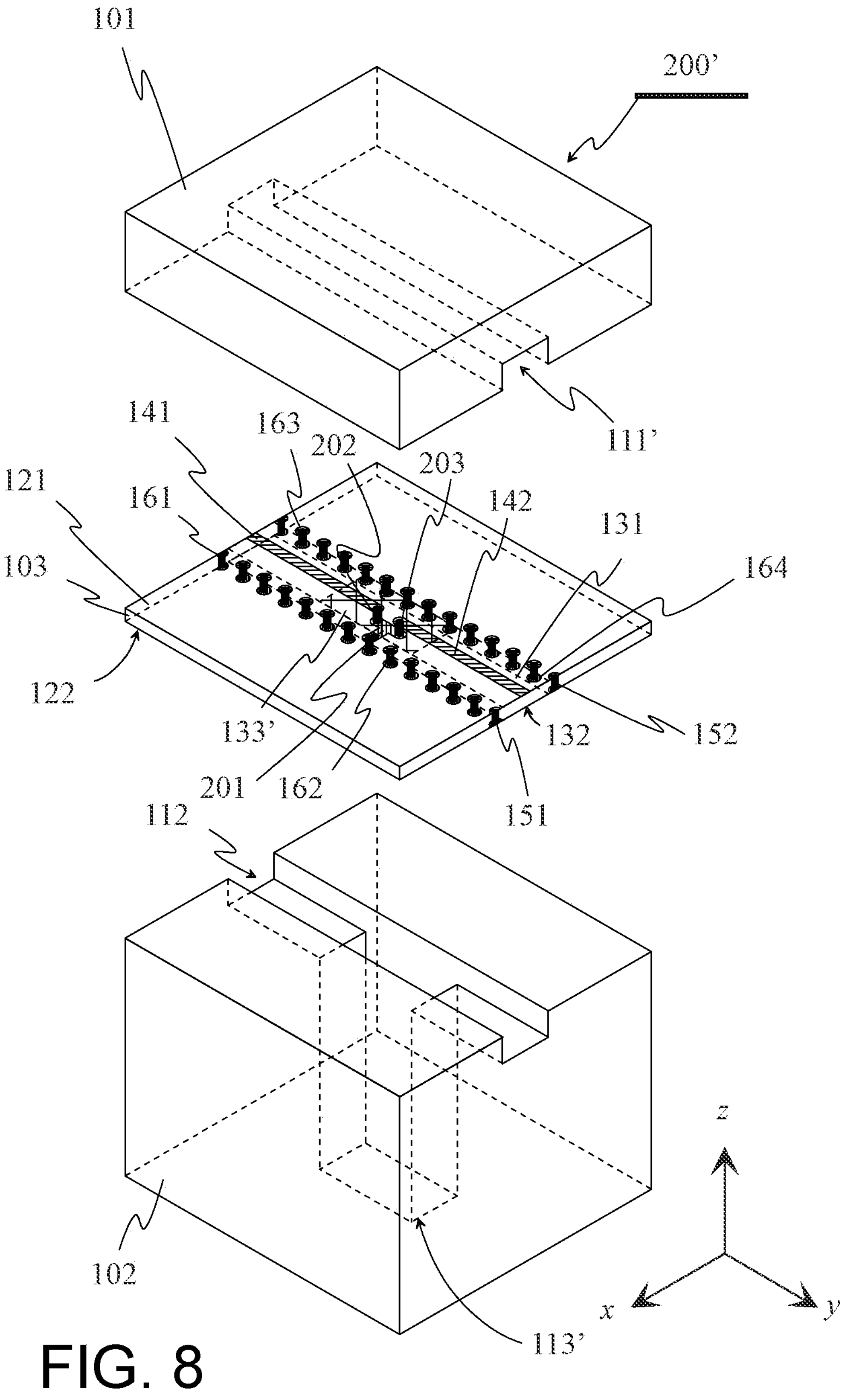
FIG. 8 is an exploded perspective view of a transducer 200' which is applicable to the second embodiment.
Figure 9:
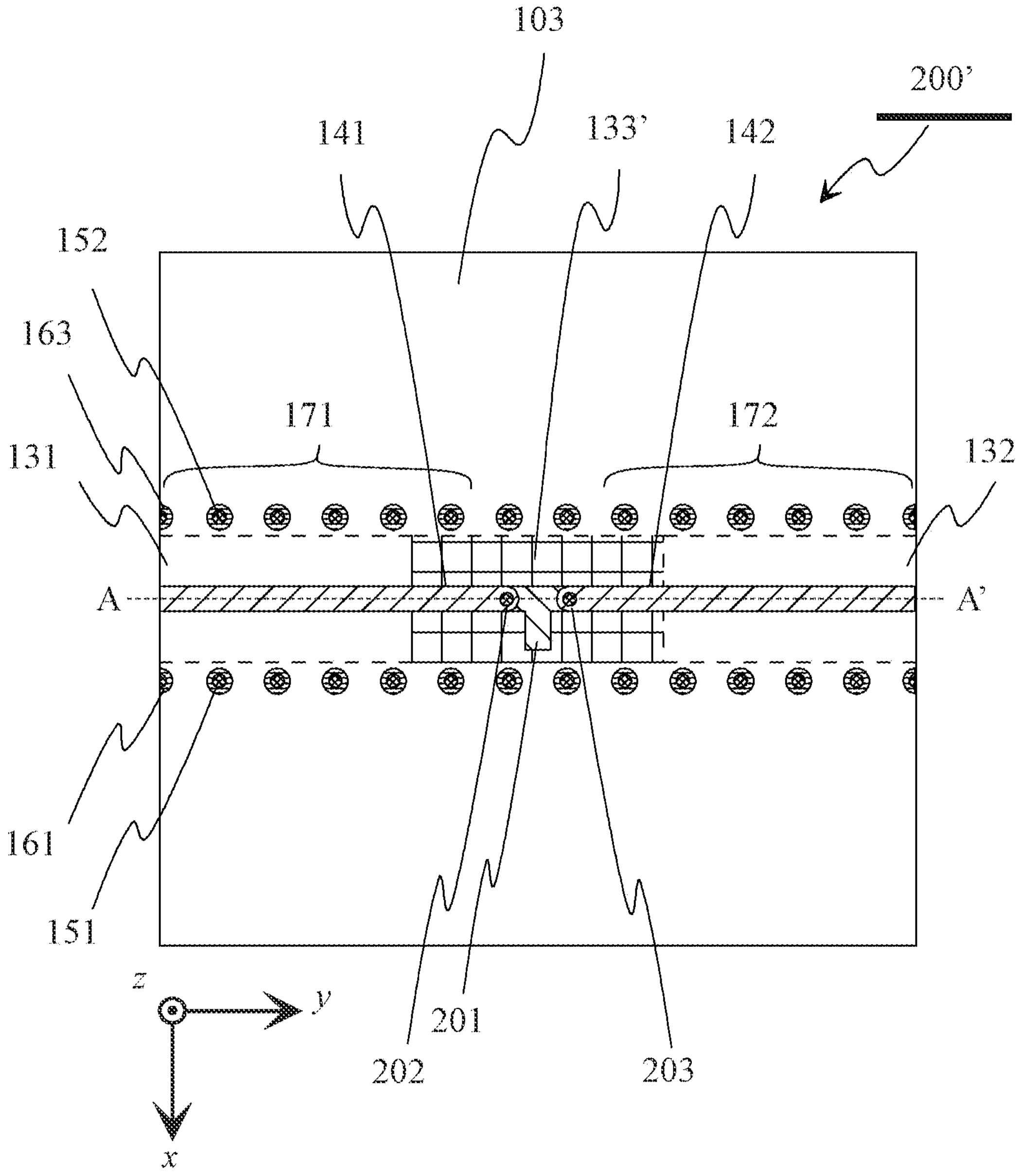
FIG. 9 is a top plan view of the transducer 200' as viewed from the +z direction.

FIG. 8 is an exploded perspective view of a transducer 200' of a modification 3. In the transducer 200', of the constituent elements of the transducer 200, the coupling conductor 201 is provided on the main surface 122. The transducer 200' also includes conductors 202 and 203. The coupling conductor 201 is provided in the space 132. FIG. 9 is a top plan view of the transducer 200' as viewed from the +z direction. For visibility purposes, the conductive member 101 is shown in a see-through manner in FIG. 9.

The conductors 202 and 203 penetrate through the substrate 103. In FIG. 8, the conductors 202 and 203 penetrate through the main surfaces 121 and 122 of the substrate 103 in the z direction. The conductor 202 electrically connects the transmission conductor 141 with the coupling conductor 201. The conductor 203 electrically connects the transmission conductor 142 with the coupling conductor 201. In the transducer 200, the transmission conductors 141 and 142 are electrically connected with each other via the coupling conductor 201. However, in the transducer 200', the transmission conductors 141 and 142 are electrically connected with each other via the conductor 202, the coupling conductor 201, and the conductor 203. In this modification, the transmission conductors 141 and 142 are provided on the main surface 121, and the coupling conductor 201 is provided on the main surface 122. However, the transmission conductors 141 and 142 may be provided on the main surface 122, and the coupling conductor 201 may be provided on the main surface 121. In other words, the transmission conductors 141 and 142 are provided on the substrate 103 and are provided in one of either the space 131 or the space 132, and the coupling conductor 201 is provided on the substrate 103 and is provided in the other of either the space 131 or the space 132.

For a method for forming the conductors 202 and 203, it is possible to use a method substantially equal to the method described with respect to the method for forming the conductors 151 and 152. In FIG. 8 and FIG. 9, one conductor 202 and one conductor 203 are used. However, at least one of the conductor 202 or the conductor 203 may be in plural.

Figure 10:
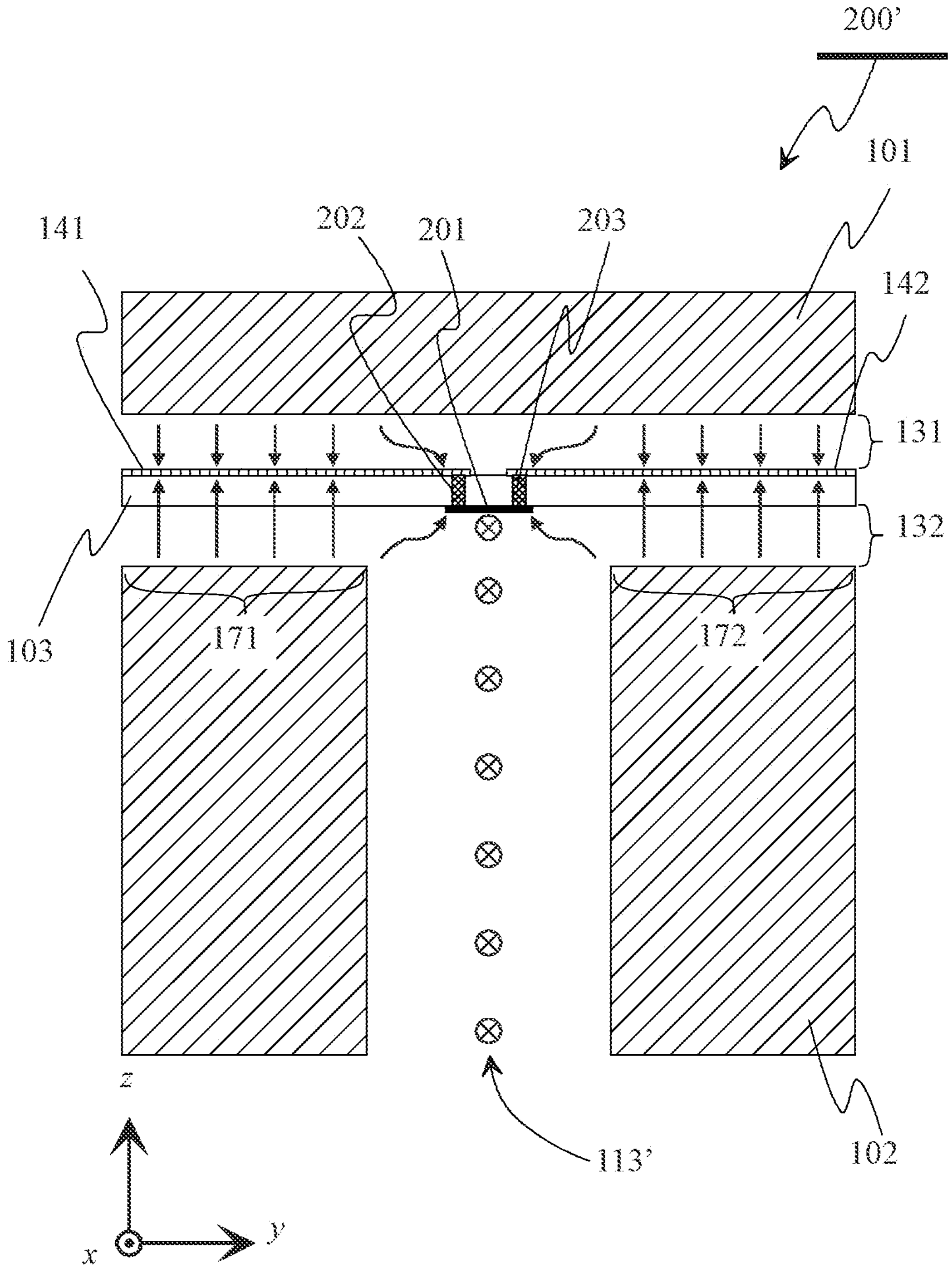
FIG. 10 is a yz plan view showing an electric field of an electromagnetic wave in the transducer 200'.

FIG. 10 is a yz plan view showing an electric field of an electromagnetic wave in the through hole 113' and the coaxial lines 171 and 172 of the transducer 200'. This plan view is a cross sectional view taken along A-A' in FIG. 8. In FIG. 9, an electromagnetic wave has an electric field substantially equal to the electric field shown in FIG. 6. The coupling conductor 201 is provided on the main surface 122 and hence, at a position above the coupling conductor 201 in the +z direction, an electric field from the front side toward the back side of a paper is weaker than the corresponding electric field in the transducer 200.

As described above, even in the case where the coupling conductor 201 is disposed on a surface different from the surface on which the transmission conductors 141 and 142 are provided, it is possible to cause the transducer to serve in the same manner as in the second embodiment.

(Modification 4)

Figure 11:
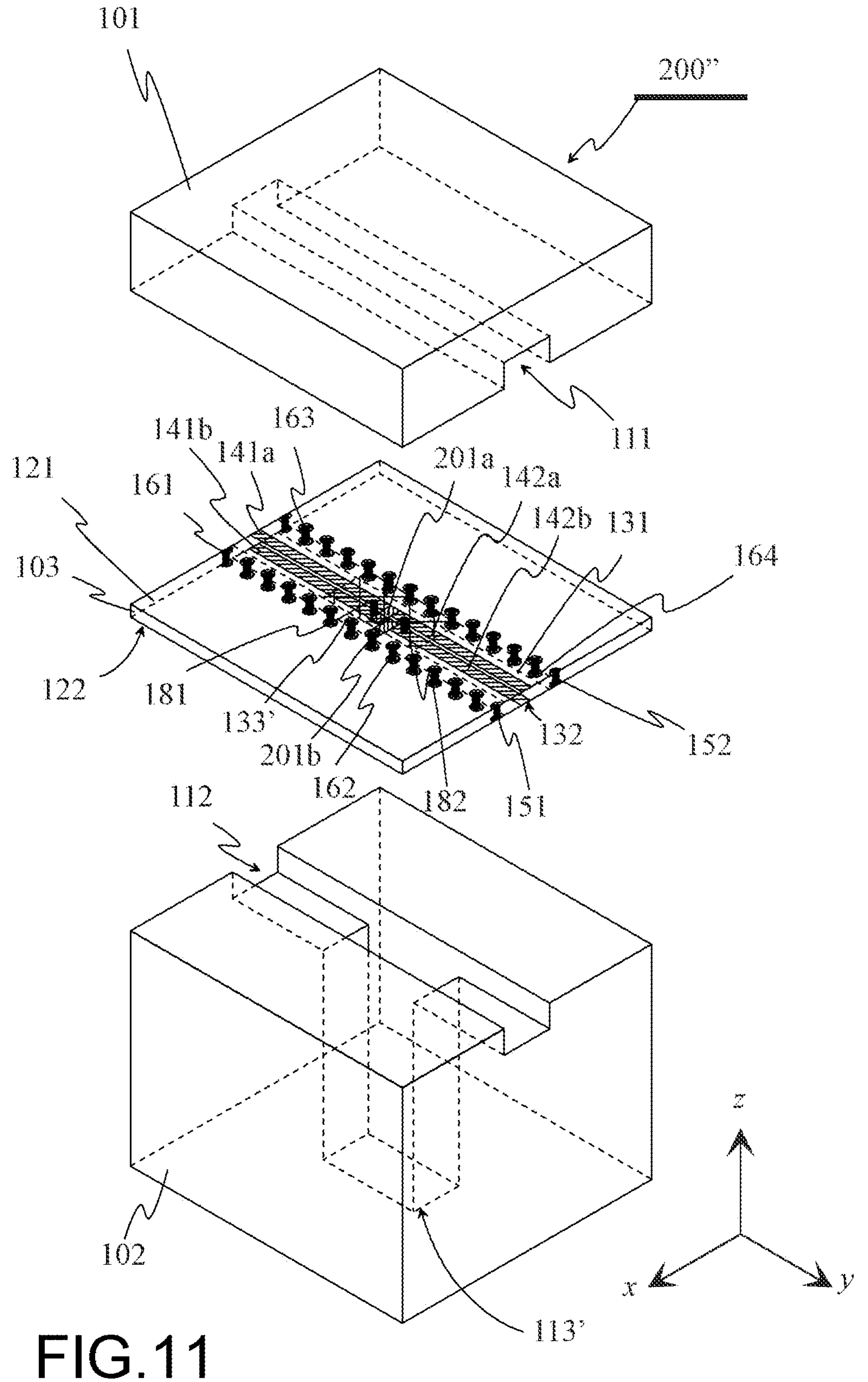
FIG. 11 is an exploded perspective view of a transducer 200" which is applicable to the second embodiment.

FIG. 11 is an exploded perspective view of the transducer 200" of a modification 4. In the transducer 200", the coupling conductor 201 of the transducer 100' is provided on each of the main surfaces 121 and 122. The coupling conductor 201 on the main surface 121 is referred to as "coupling conductor 201*a*", and the coupling conductor 201 on the main surface 122 is referred to as "coupling conductor 201*b*". The coupling conductor 201*a* is provided in the space 131, and the coupling conductor 201*b* is provided in the space 132.

The coupling conductor 201*a* electrically connects the transmission conductor 141*a* with the transmission conductor 142*a*, and the coupling conductor 201*b* electrically connects the transmission conductor 141*b* with the transmission conductor 142*b*. The conductors 181 and 182 electrically connect the transmission conductor 141*a*, the coupling conductor 201*a*, and the transmission conductor 142*a* with the transmission conductor 141*b*, the coupling conductor 201*b*, and the transmission conductor 142*b*. In FIG. 11, two conductors, that is, the conductor 181 and the conductor 182 are used. However, one conductor may be used, or three or more conductors may be used.

The transmission conductors 141 and 142 and the coupling conductor 201 are provided on each of both surfaces of the substrate 103 and hence, it is possible to improve transmission efficiency of an electromagnetic wave.

As has been described heretofore, the transducer of this embodiment distributes an electromagnetic wave inputted from the through hole 113' so as to propagate the electromagnetic wave through the transmission conductors 141 and 142 (the coaxial lines 171 and 172). In the transducer of this embodiment, the connection of the waveguide is not separated from the connection of the coaxial line and hence, it is possible to achieve a small-sized transducer. By reducing the size of the transducer, it is possible to reduce a weight, to improve the degree of freedom in design of the waveguide and the coaxial line, and to reduce costs, for example.

The transducer of this embodiment combines electromagnetic waves inputted into the transmission conductors 141 and 142 (the coaxial lines 171 and 172), and propagates the combined electromagnetic wave through the through hole 113'. In the same manner as the case where an electromagnetic wave is distributed, the transducer of this embodiment can reduce a size, reduce a weight, improve the degree of freedom in design of the waveguide and the coaxial line, and reduce costs, for example. In the transducer of this embodiment, the phase of an electromagnetic wave inputted into the transmission conductor 141 (the coaxial line 171) and the phase of an electromagnetic wave inputted into the transmission conductor 142 (the coaxial line 172) are the same phase. The transducer of this embodiment can perform combining corresponding to the same phase.

Third Embodiment

Figure 12:
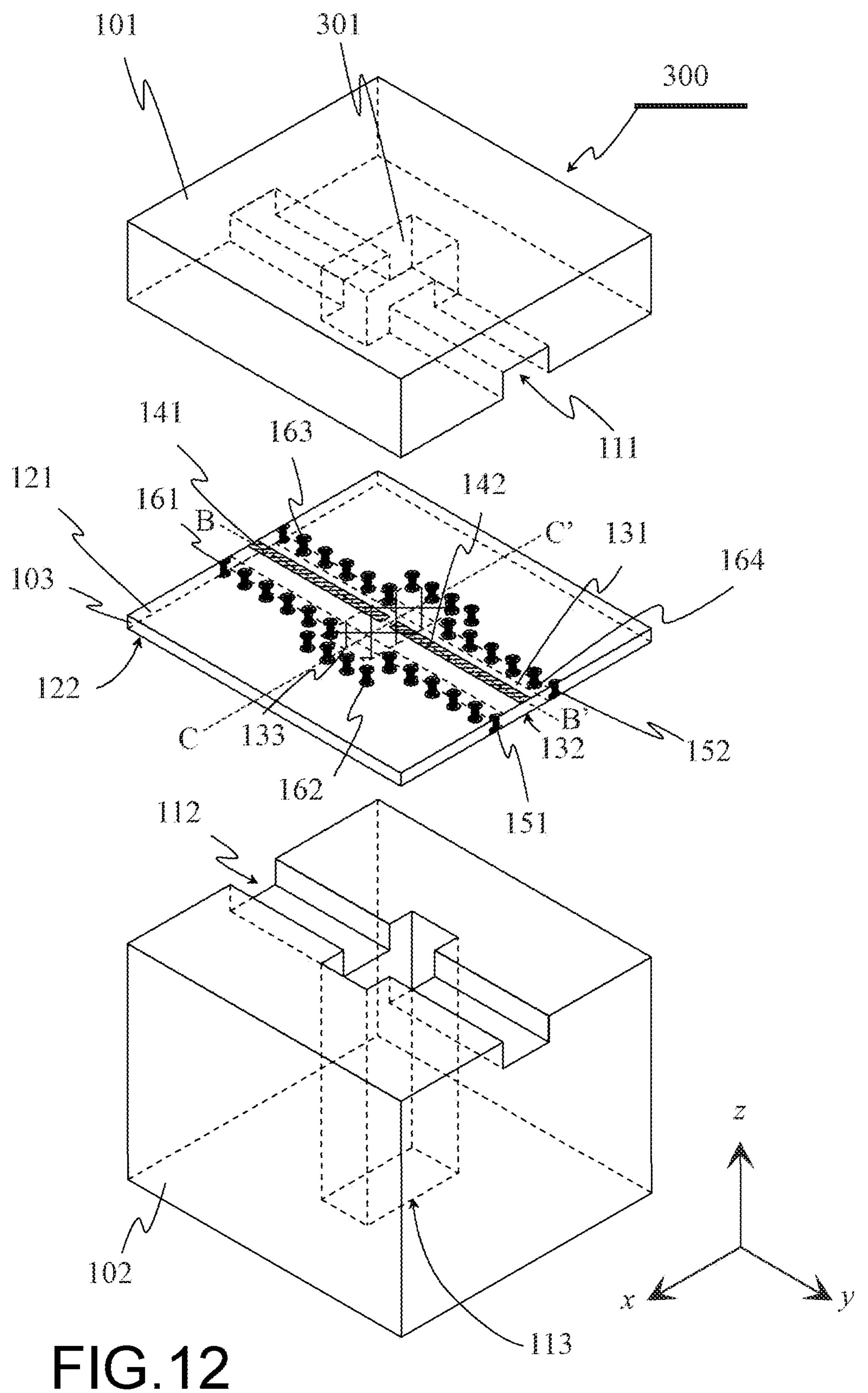
FIG. 12 is an exploded perspective view of a transducer 300 of a third embodiment.

FIG. 12 is an exploded perspective view of a transducer 300 of a third embodiment. The transducer 300 is a transducer where the conductive member 101 of the transducer 100 of the first embodiment further has a recess 301. Constituent elements of the transducer 300 other than the recess 301 are substantially equal to the corresponding constituent elements of the transducer 100 and hence, the corresponding constituent elements are given the same numerals, and the description of such constituent elements will be omitted.

The depth (size) of the recess 301 in the z direction is greater than that of the recess 111. At least a portion of the recess 301 is included in the orthogonal projection of the through hole 113 in the z direction. In other words, a portion of the recess 111 that is included in the orthogonal projection of the through hole 113 in the z direction forms the recess 301 having a greater depth. The space 131 is increased by an amount corresponding to the recess 301. Hereinafter, a space that corresponds to the recess 301 is referred to as "space 311".

Figure 13:
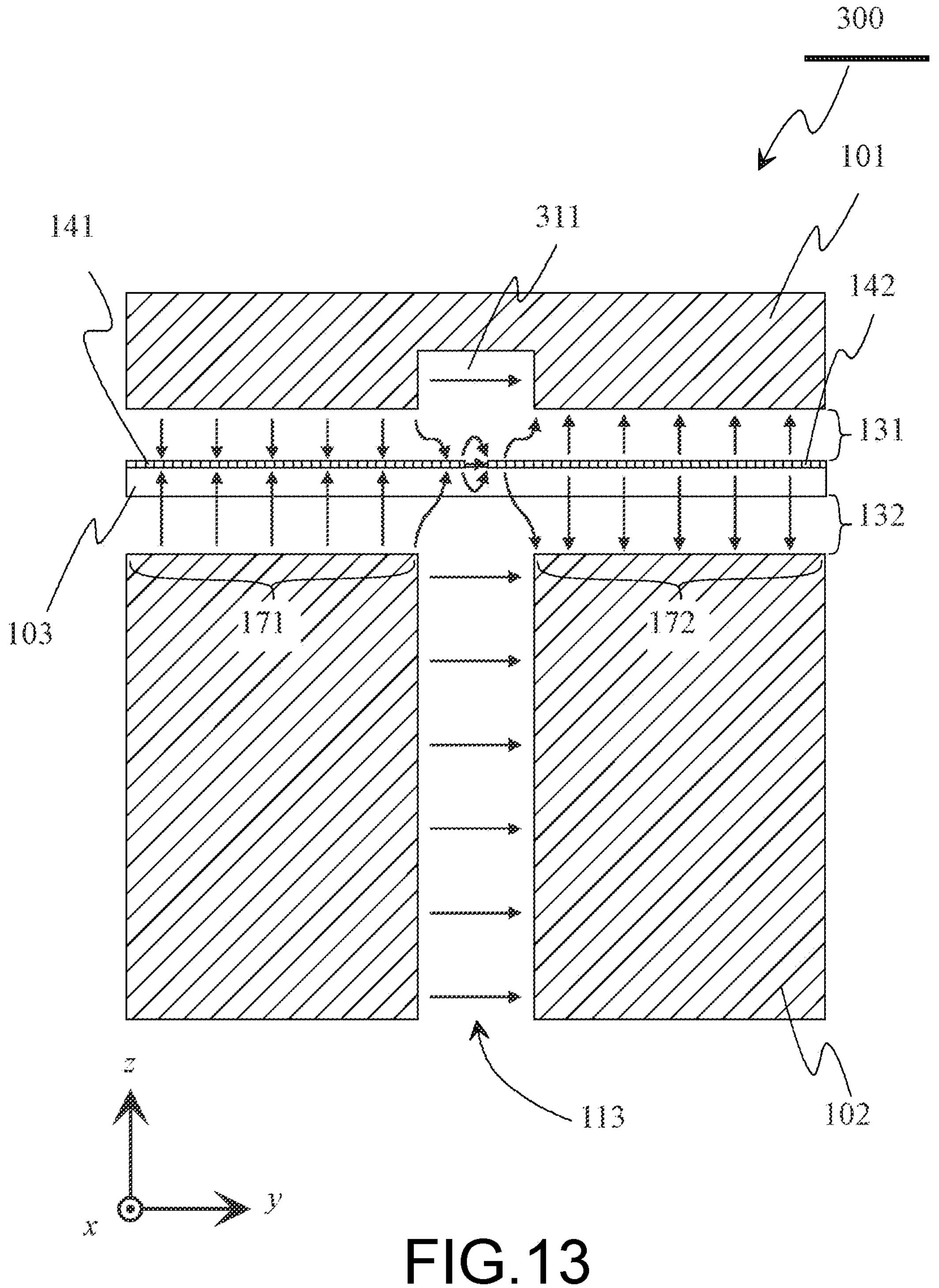
FIG. 13 is a yz plan view showing an electric field of an electromagnetic wave in the transducer 300.

FIG. 13 is a yz plan view showing an electric field generated by an electromagnetic wave in the through hole 113 and the coaxial lines 171 and 172 of the transducer 300. This plan view is a cross sectional view taken along B-B' in FIG. 12. In FIG. 13, an electromagnetic wave has an electric field substantially equal to the electric field shown in FIG. 3. In the same manner as the through hole 113, an electromagnetic wave has an electric field in the +y direction in the space 311.

The conductive member 101 has the recess 301 and hence, it is possible to suppress the effect in which an electromagnetic wave inputted from the through hole 113 is reflected by the conductive member 101. In some frequency bands of electromagnetic waves, due to the effect of a reflected wave from the conductive member 101 (hereinafter also simply referred to as "reflected wave"), inputted electromagnetic waves may strengthen or weaken each other depending on the position in the through hole 113. In other words, a reflected wave may interfere with an inputted electromagnetic wave. When the reflected wave interferes with the inputted electromagnetic wave, a standing wave is generated in the through hole 113. This standing wave may inhibit the propagation of an electromagnetic wave. The same applies for a case where electromagnetic waves inputted into the transmission conductors 141 and 142 (the coaxial lines 171 and 172) are combined, and are propagated through the through hole 113. The conductive member 101 has the recess 301 and hence, it is possible to suppress the effect in which a combined electromagnetic wave that is propagated through the through hole 113 is reflected by the conductive member 101.

Figure 14:
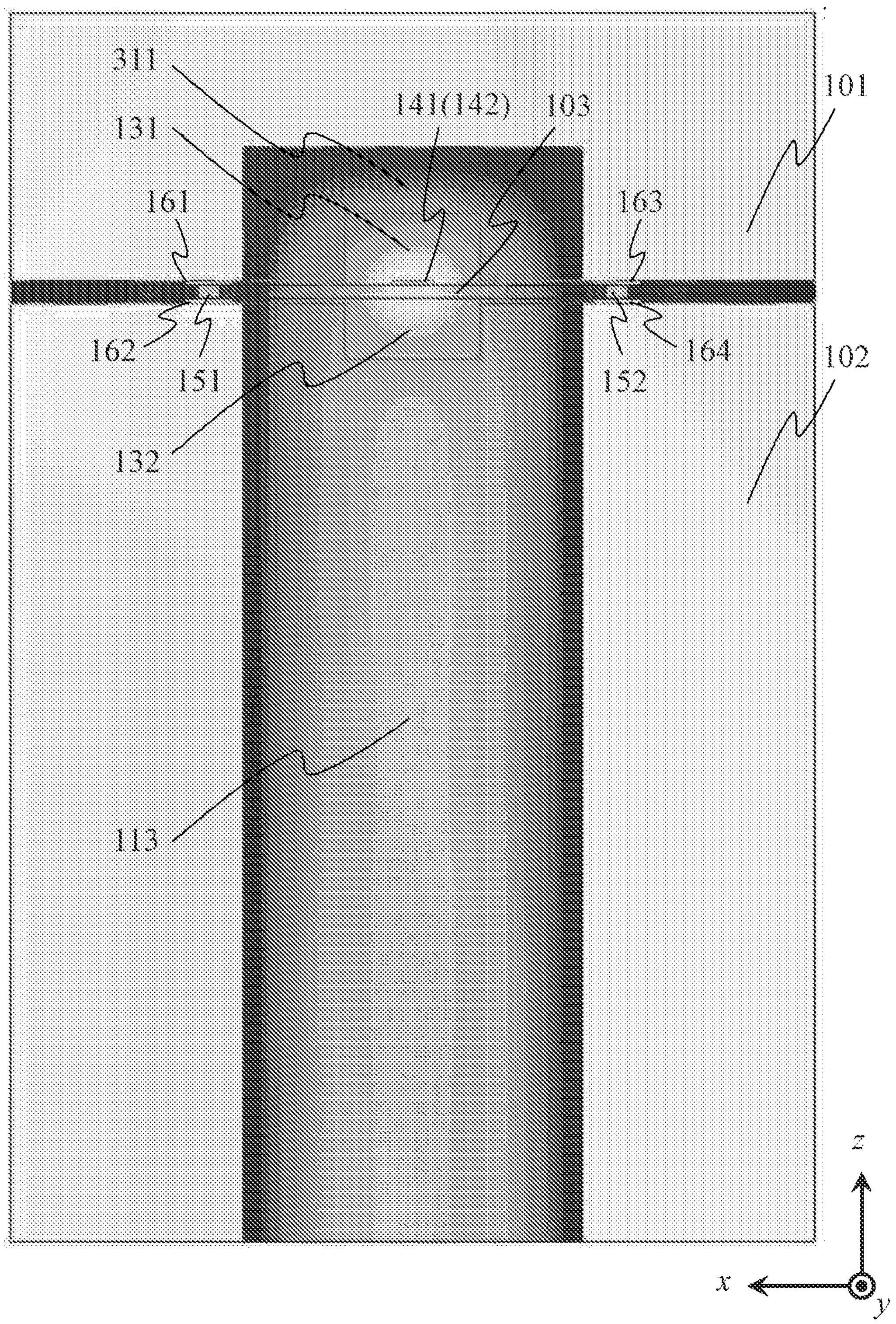
FIG. 14 is a view showing an amplitude of an electric field on the xz plane of the transducer 300.

FIG. 14 shows an amplitude of an electric field on the xz plane of the transducer 300. This plane is a cross section taken along C-C' in FIG. 12. For visibility purposes, the transmission conductor 141 (142) is shown on the main surface 121 of the substrate 103. FIG. 14 shows the intensity of the electric field in the substrate 103, the through hole 113, and the spaces 131, 132, and 311. Brighter color indicates a stronger electric field, and darker color indicates a weaker electric field.

The amplitude of an electric field increases toward the center of the through hole 113 in the x direction. In the space 311, the amplitude of an electric field increases toward the center in the x direction and toward the end portion of the space 311 in the −z direction. In the through hole 113, a change in amplitude of an electric field is small in the z direction. Across the entire transducer, the amplitude of an electric field is the highest in the vicinity of the transmission conductor 141 (142). The drawing shows that an electric field is dispersed not only in the vicinity of the substrate but also in the spaces 131 and 132. In the case where a standing wave is generated, a region having a large change in amplitude of an electric field in the z direction is present at a portion in the through hole 113. Such a region is generated due to reflected waves strengthening or weakening each other. Due to the formation of the recess 301, even if an electromagnetic wave is reflected by the conductive member 101, it is possible to reduce an effect on an electromagnetic wave inputted into the through hole 113. The depth of the recess 301 in the z direction is determined according to the frequency band of an electromagnetic wave inputted into the through hole 113.

The transducer 300 has been described heretofore. This embodiment is given for the sake of example, and various modifications are conceivable. For example, the first embodiment, the second embodiment, or the modification described in the first embodiment or the second embodiment is applicable without causing confliction. For example, the conductive member 101 of the transducer of the second embodiment may have a recess similar to the recess 301 in this embodiment.

As has been described heretofore, the transducer of this embodiment distributes an electromagnetic wave inputted from the through hole 113 so as to propagate the electromagnetic wave through the transmission conductors 141 and 142 (the coaxial lines 171 and 172). Further, the conductive member 101 has the recess 301. With such a configuration, in addition to the advantageous effect described in the first embodiment, it is possible to suppress the effect in which an electromagnetic wave inputted from the through hole 113 is reflected by the conductive member 101.

The transducer of this embodiment combines electromagnetic waves inputted into the transmission conductors 141 and 142 (the coaxial lines 171 and 172), and propagates the combined electromagnetic wave through the through hole 113. The conductive member 101 has the recess 301 and hence, in addition to the advantageous effects described in the first embodiment, it is possible to suppress the effect in which an electromagnetic wave which is propagated through the through hole 113 is reflected by the conductive member 101.

Fourth Embodiment

Figure 15:
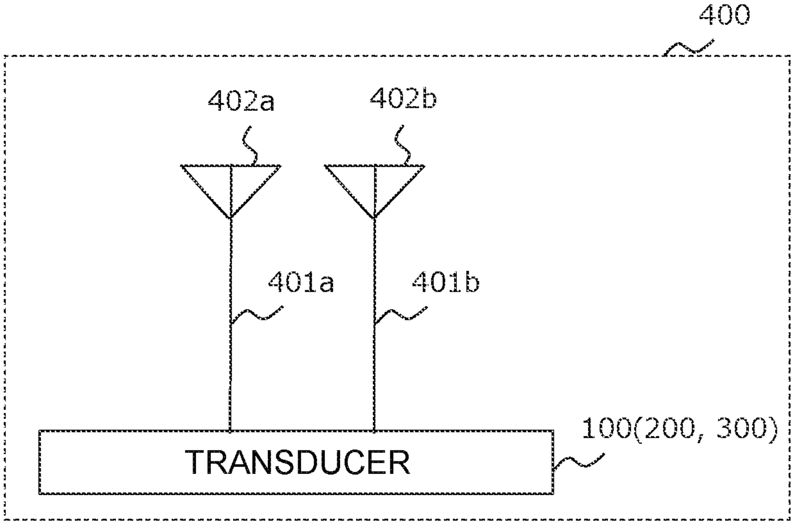
FIG. 15 is a configuration diagram of an antenna apparatus 400 of a fourth embodiment.

FIG. 15 is a configuration diagram of an antenna apparatus 400 of a fourth embodiment. The antenna apparatus 400 includes the transducer 100 (200, 300), coaxial lines 401*a*, 401*b*, and antenna elements 402*a*, 402*b*. The transducer 100 (200, 300) indicates that any of all transducers described in the first to third embodiment and the modifications is applicable. The through hole 113 and the through hole 113' are generically referred to as "through hole 113".

The coaxial line 401*a* is connected to the coaxial line 171 to propagate an electromagnetic wave. The coaxial line 401*b* is connected to the coaxial line 172 to propagate an electromagnetic wave.

The antenna element 402*a* performs at least one of radiating an electromagnetic wave to be transmitted, which is sent from the coaxial line 401*a*, (hereinafter also referred to as "transmitted electromagnetic wave"), or receiving an electromagnetic wave to be received in a space outside the antenna apparatus 400 (hereinafter also referred to as "received electromagnetic wave") and sending the electromagnetic wave to the coaxial line 401*a*. The antenna element 402*b* radiates an electromagnetic wave to be transmitted which is sent from the coaxial line 401*b*, or receives an electromagnetic wave to be received and sends the received electromagnetic wave to the coaxial line 401*b*. A electromagnetic wave to be transmitted is inputted into the through hole 113, and is propagated through the coaxial lines 171 and 172. A electromagnetic wave to be transmitted is sent to the antenna element 402*a* from the coaxial line 171 via the coaxial line 401*a*, and is sent to the antenna element 402*b* from the coaxial line 172 via the coaxial line 401*b*. A received electromagnetic wave is outputted via the antenna element 402*a*, the coaxial lines 401*a*, 171, and the through hole 113, and is outputted via the antenna element 402*b*, the coaxial lines 401*b*, 172, and the through hole 113.

Provided that an antenna element can radiate an electromagnetic wave to be transmitted and can receive an electromagnetic wave to be received, any antenna element may be used for each of the antenna elements 402*a* and 402*b*. Examples of the antenna element include a linear antenna, a plate-like antenna, a planar antenna, a slot antenna, or the like. In the case of the slot antenna, a slot formed in the coaxial line 401*a* serves as the antenna element 402*a*, and a slot formed in the coaxial line 401*b* serves as the antenna element 402*b*. In the case of the slot antenna, the slot formed in each of the coaxial lines 401*a* and 402*b* is referred to as "antenna element".

By forming the antenna apparatus 400 by using the transducer 100 (200, 300), it is possible to achieve a small-sized antenna apparatus 400. In FIG. 15, one coaxial line 401*a*, one coaxial line 401*b*, one antenna element 402*a*, and one antenna element 402*b* are used. However, the configuration is not limited to such a case. For example, each of the coaxial lines 401*a* and 401*b* may have a branch to achieve a plurality of outputs. A plurality of antenna elements 402*a* may be used for one coaxial line, and a plurality of antenna elements 402*b* may be used for one coaxial line. Each of the antenna elements 402*a* and 402*b* may be connected to a plurality of coaxial lines. The coaxial line 171 may be directly connected to the antenna element 402*a*, and the coaxial line 172 may be directly connected to the antenna element 402*b*.

Fifth Embodiment

Figure 16:
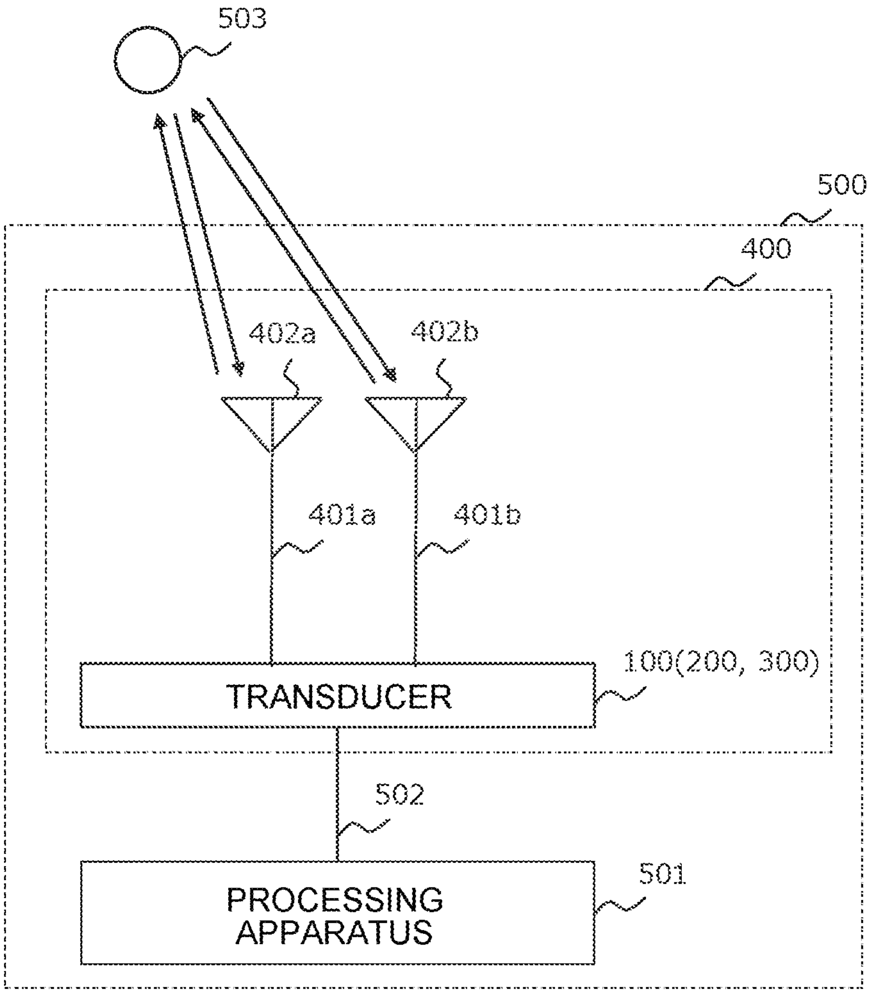
FIG. 16 is a configuration diagram of a wireless apparatus 500 of a fifth embodiment.

FIG. 16 is a configuration diagram of a wireless apparatus 500 of a fifth embodiment. The wireless apparatus 500 includes the antenna apparatus 400 described in the fourth embodiment, a processing apparatus 501, and a waveguide 502. The wireless apparatus 500 outputs at least one of the position, the direction, or the size of a target 503, or the distance to the target 503 from the wireless apparatus 500, for example.

The processing apparatus 501 performs at least one of generating a electromagnetic wave to be transmitted and inputting the electromagnetic wave to be transmitted into the through hole 113 of the transducer 100 (200, 300) via the waveguide 502 or receiving an received electromagnetic wave from the through hole 113 via the waveguide 502 and performing signal processing. A electromagnetic wave to be transmitted is radiated by the antenna apparatus 400 described in the fourth embodiment. A electromagnetic wave to be received is received by the antenna apparatus 400 described in the fourth embodiment, and is sent to the processing apparatus 501 from the through hole 113.

Based on an electromagnetic wave to be transmitted and a received electromagnetic wave, the processing apparatus 501 estimates at least one of the position, the direction, or the size of the wireless apparatus 500, or the distance to the target 503 from the wireless apparatus 500. To be more specific, the processing apparatus 501 estimates at least one of the position, the direction, or the size of the wireless apparatus 500, or the distance to the target 503 from the wireless apparatus 500 based on a difference between a electromagnetic wave to be transmitted and a received electromagnetic wave. The processing apparatus 501 generates information indicating at least one of the estimated position, the estimated direction, or the estimated size of the target 503, or the estimated distance to the target 503 from the wireless apparatus 500, and outputs the information. This information may be outputted to any output destination in any output mode. For example, this information can be outputted to an apparatus that analyzes this information, an apparatus that visually displays this information, an apparatus that maintains this information, or other apparatuses. This information may be outputted in any mode, such as text data, image data, data conforming to the format of analysis, or notification data.

The processing apparatus 501 is formed of one or more electronic circuits including a control unit and an arithmetic unit. The electronic circuit may be achieved by an analog circuit, a digital circuit, or the like. For example, the electronic circuit may be achieved by a general purpose processor, a central processing unit (CPU), a microprocessor, a digital signal processor (DSP), an ASIC, an FPGA, or a combination of the above.

By forming the wireless apparatus 500 by using the transducer 100 (200, 300), it is possible to achieve a small-sized wireless apparatus 500. In FIG. 16, the processing apparatus 501 is connected with the transducer 100 (200, 300) by the waveguide 502. However, the processing apparatus 501 may be directly connected to the conductive member 102 having the through hole 113.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A transducer comprising:

a first conductive member;

a substrate configured to form a first space with the first conductive member;

a second conductive member opposed to the first conductive member via the substrate interposed between the second conductive member and the first conductive member, and configured to form a second space with the substrate;

a plurality of first conductors through the substrate and configured to electrically connect the first conductive member with the second conductive member;

a first transmission conductor being on the substrate and being in at least one of the first space or the second space; and a second transmission conductor being on the substrate, being in at least one of the first space or the second space, and separated from the first transmission conductor, wherein the second conductive member includes a through hole through the second conductive member in a first direction in which the second conductive member is opposed to the first conductive member, and connecting to the second space, and an orthogonal projection of the through hole in the first direction includes at least a portion of the first transmission conductor and at least a portion of the second transmission conductor, wherein the first conductive member includes a first recess, the second conductive member includes a second recess, the first space is formed by the first recess and the substrate, the second space is formed by the second recess and the substrate, the first conductive member includes a third recess having a depth in the first direction greater than a depth of the first recess in the first direction, and the orthogonal projection of the through hole in the first direction further includes at least a portion of the third recess.

2. The transducer according to claim 1, wherein the depth of the third recess in the first direction is determined corresponding to a frequency band of an electromagnetic wave inputted into the through hole.

* * * * *